United States Patent
Kawashima et al.

(10) Patent No.: US 7,797,572 B2
(45) Date of Patent: Sep. 14, 2010

(54) COMPUTER SYSTEM MANAGEMENT METHOD, MANAGEMENT SERVER, COMPUTER SYSTEM, AND PROGRAM

(75) Inventors: Toru Kawashima, Yokohama (JP);
Nobuo Kawamura, Atsugi (JP);
Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 11/620,179

(22) Filed: Jan. 5, 2007

(65) Prior Publication Data

US 2007/0180314 A1    Aug. 2, 2007

(30) Foreign Application Priority Data

Jan. 6, 2006    (JP)    ............................ 2006-001831
Dec. 6, 2006    (JP)    ............................ 2006-329366

(51) Int. Cl.
*G06F 11/00*    (2006.01)
(52) U.S. Cl. .................................... 714/7; 714/5; 714/6
(58) Field of Classification Search ..................... 714/4, 714/6, 7

See application file for complete search history.

(56) References Cited

U.S. PATENT DOCUMENTS 5,283,897 A * 2/1994 Georgiadis et al. .......... 718/105

(Continued)

FOREIGN PATENT DOCUMENTS

JP    2000047894 A    *    2/2000

OTHER PUBLICATIONS

Gray, J., and Reuter, A., "Transaction Processing: Concepts and Techniques." Morgan Kaufman Publishers (1993), San Mateo, CA. (6 pages).

(Continued)

*Primary Examiner*—Robert Beausoliel
*Assistant Examiner*—Joshua P Lottich
(74) *Attorney, Agent, or Firm*—Antonelli, Terry, Stout & Kraus, LLP.

(57) ABSTRACT

This invention provides a method of controlling switching of computers according to a cause of failure without preparing one standby node for each active node. For n active nodes (200), m standby nodes (300) of different characteristics (in terms of CPU performance, I/O performance, communication performance, and the like) are prepared. The m standby nodes (300) are assigned in advance with priority levels to be failover targets for each cause of failure. When a failure occurs in one active node (200), a standby node that can remove the cause of the failure is chosen out of the m standby nodes (300) to take over data processing.

27 Claims, 27 Drawing Sheets

U.S. PATENT DOCUMENTS

| | | | |
|---|---|---|---|
| 5,673,382 A * | 9/1997 | Cannon et al. | 714/6 |
| 5,938,729 A * | 8/1999 | Cote et al. | 709/224 |
| 5,959,859 A * | 9/1999 | Maruyama | 700/2 |
| 6,145,089 A * | 11/2000 | Le et al. | 714/4 |
| 6,266,784 B1 * | 7/2001 | Hsiao et al. | 714/6 |
| 6,314,526 B1 * | 11/2001 | Arendt et al. | 714/4 |
| 6,438,705 B1 * | 8/2002 | Chao et al. | 714/4 |
| 6,446,218 B1 * | 9/2002 | D'Souza | 714/4 |
| 6,553,401 B1 * | 4/2003 | Carter et al. | 709/200 |
| 6,986,076 B1 * | 1/2006 | Smith et al. | 714/4 |
| 7,076,688 B2 * | 7/2006 | Yamamoto | 714/6 |
| 7,246,256 B2 * | 7/2007 | De La Cruz et al. | 714/4 |
| 7,281,154 B2 * | 10/2007 | Mashayekhi et al. | 714/4 |
| 7,287,075 B2 * | 10/2007 | Srivastava et al. | 709/224 |
| 7,305,531 B2 * | 12/2007 | Iwamura et al. | 711/162 |
| 7,325,156 B1 * | 1/2008 | Schloss et al. | 714/6 |
| 7,337,353 B2 * | 2/2008 | Yamamoto et al. | 714/7 |
| 7,360,113 B2 * | 4/2008 | Anderson et al. | 714/5 |
| 7,373,546 B2 * | 5/2008 | Nguyen et al. | 714/5 |
| 7,383,462 B2 * | 6/2008 | Osaki et al. | 714/2 |
| 7,392,302 B2 * | 6/2008 | Halpern | 709/223 |
| 7,392,421 B1 * | 6/2008 | Bloomstein et al. | 714/4 |
| 7,434,087 B1 * | 10/2008 | Singh | 714/4 |
| 7,444,536 B1 * | 10/2008 | Jairath | 714/4 |
| 7,475,274 B2 * | 1/2009 | Davidson | 714/4 |
| 7,480,814 B2 * | 1/2009 | Shinohara et al. | 714/4 |
| 7,480,816 B1 * | 1/2009 | Mortazavi et al. | 714/4 |
| 7,484,040 B2 * | 1/2009 | Deicke et al. | 711/115 |
| 7,496,668 B2 * | 2/2009 | Hawkinson et al. | 709/227 |
| 7,512,668 B2 * | 3/2009 | Koegel | 709/217 |
| 7,523,286 B2 * | 4/2009 | Ramany et al. | 711/170 |
| 2002/0133737 A1 * | 9/2002 | Novick | 714/5 |
| 2003/0005350 A1 * | 1/2003 | Koning et al. | 714/4 |
| 2003/0037275 A1 * | 2/2003 | Bakke et al. | 714/4 |
| 2003/0212920 A1 * | 11/2003 | Fujibayashi | 714/7 |
| 2004/0083401 A1 * | 4/2004 | Furukawa et al. | 714/7 |
| 2004/0123180 A1 * | 6/2004 | Soejima et al. | 714/5 |
| 2004/0153708 A1 * | 8/2004 | Joshi et al. | 714/4 |
| 2004/0153719 A1 * | 8/2004 | Achiwa et al. | 714/5 |
| 2004/0153728 A1 * | 8/2004 | Suzuki et al. | 714/6 |
| 2004/0181707 A1 * | 9/2004 | Fujibayashi | 714/6 |
| 2004/0205382 A1 * | 10/2004 | Noda et al. | 714/6 |
| 2004/0210605 A1 * | 10/2004 | Hara et al. | 707/200 |
| 2005/0015685 A1 * | 1/2005 | Yamamoto | 714/54 |
| 2005/0138517 A1 * | 6/2005 | Monitzer | 714/746 |
| 2005/0149684 A1 * | 7/2005 | Sankaran et al. | 711/162 |
| 2005/0159927 A1 * | 7/2005 | Cruz et al. | 702/188 |
| 2005/0193227 A1 * | 9/2005 | Nakahara et al. | 714/4 |
| 2005/0198552 A1 * | 9/2005 | Baba et al. | 714/4 |
| 2005/0262317 A1 * | 11/2005 | Nakanishi et al. | 711/162 |
| 2005/0283636 A1 * | 12/2005 | Vasudevan et al. | 714/2 |
| 2005/0283638 A1 * | 12/2005 | Kato | 714/2 |
| 2006/0029016 A1 * | 2/2006 | Peles | 370/328 |
| 2006/0053337 A1 * | 3/2006 | Pomaranski et al. | 714/4 |
| 2006/0074937 A1 * | 4/2006 | Bird et al. | 707/100 |
| 2006/0075156 A1 * | 4/2006 | Okaki et al. | 710/17 |
| 2006/0143498 A1 * | 6/2006 | Hatasaki et al. | 714/4 |
| 2006/0294207 A1 * | 12/2006 | Barsness et al. | 709/220 |
| 2007/0006023 A1 * | 1/2007 | Fujibayashi | 714/7 |
| 2007/0016822 A1 * | 1/2007 | Rao et al. | 714/4 |
| 2007/0101202 A1 * | 5/2007 | Garbow | 714/47 |
| 2007/0174660 A1 * | 7/2007 | Peddada | 714/4 |
| 2007/0174661 A1 * | 7/2007 | Peddada | 714/4 |
| 2007/0283186 A1 * | 12/2007 | Madnani et al. | 714/6 |
| 2008/0159130 A1 * | 7/2008 | Abe | 370/229 |
| 2009/0024868 A1 * | 1/2009 | Joshi et al. | 714/4 |
| 2009/0097406 A1 * | 4/2009 | Nilakantan et al. | 370/235 |

OTHER PUBLICATIONS

DeWitt, D. J., and Gray, J., "Parallel Database Systems: The Future of High Performance Database Processing." Communications of the ACM, vol. 36, No. 6, Jun. 1992.

* cited by examiner

| | HIGH PERFORMANCE | | LOW PERFORMANCE |
|---|---|---|---|
| CPU PERFORMANCE | BACKUP NODE A | BACKUP NODE B | BACKUP NODE C |
| I/O PERFORMANCE | BACKUP NODE C | BACKUP NODE A | BACKUP NODE B |
| COMMUNICATION PERFORMANCE | BACKUP NODE B | BACKUP NODE C | BACKUP NODE A |

CPU, I/O CONTROL DEVICE, AND COMMUNICATION CONTROL DEVICE PERFORMANCE DIFFERENCES BETWEEN BACKUP NODES

FIG. 6

| BACKUP NODE NAME (131) | CPU LOAD (132) | I/O LOAD (133) | COMMUNICATION FAILURE (134) | DBMS FAILURE (135) |
|---|---|---|---|---|
| A | 1 | 2 | 3 | 2 |
| B | 2 | 3 | 1 | 1 |
| C | 3 | 1 | 2 | 3 |

BACKUP NODE PRIORITY TABLE (130)

FIG. 7

| 1301 | 1302 | 1303 | 1304 | 1305 | 1306 | 1307 |
|---|---|---|---|---|---|---|
| BACKUP NODE NAME | CPU PERFORMANCE | MEMORY CAPACITY | I/O PERFORMANCE (EXCLUSIVE/SHARED) | COMMUNICATION PERFORMANCE | OS SETTINGS A | OS SETTINGS B |
| A | 100 | 0.5GByte | EXCLUSIVE | 1Gbps | 10 | 100 |
| B | 150 | 1GByte | SHARED | 0.5Gbps | 5 | 200 |
| C | 130 | 0.8Gbyte | EXCLUSIVE | 1.2Gbps | 5 | 300 |

1300

BACKUP NODE MANAGEMENT TABLE

*FIG. 18*

| DB INFORMATION | THRESHOLD | NECESSARY RESOURCE/DETAILS | |
|---|---|---|---|
| | | SUBJECT RESOURCE NAME | NECESSARY RESOURCE CAPACITY |
| MESSAGE QUEUE OVERSTAY TIME | 60 | CPU PERFORMANCE | CURRENT VALUE + ADDITIONAL 20% |
| EXCESS DB PROCESSING PROCESS (THREAD) DOWN COUNT WITHIN UNIT TIME | 10 | CPU PERFORMANCE | CURRENT VALUE + ADDITIONAL 30% |
| | | I/O PERFORMANCE | EXCLUSIVE |
| EXCESS EXCLUSIVE TIMEOUT COUNT | 5 | CPU PERFORMANCE | CURRENT VALUE + ADDITIONAL 30% |
| UAP (SQL) EXECUTION OVERTIME | 60 | CPU PERFORMANCE | CURRENT VALUE + ADDITIONAL 10% |
| | | MEMORY CAPACITY | CURRENT VALUE + ADDITIONAL 50% |
| EXCESS EXCLUSIVE COMPETITION COUNT | 10 | OS SETTINGS A | CURRENT VALUE+100 |
| LOG BUFFER FILLED COUNT | 20 | DB INTERIOR BUFFER SIZE 1 | CURRENT VALUE+20% |
| DB INPUT/OUTPUT BUFFER HIT RATE | 20 | DB INTERIOR BUFFER SIZE 2 | CURRENT VALUE+30% |

DB INFORMATION ANALYSIS TABLE

FIG. 19

COMPUTER SYSTEM MANAGEMENT METHOD, MANAGEMENT SERVER, COMPUTER SYSTEM, AND PROGRAM

CLAIM OF PRIORITY

The present application claims priority from Japanese application P2006-329366 filed on Dec. 6, 2006, and Japanese application P2006-001831 filed on Jan. 6, 2006, the content of which is hereby incorporated by reference into these application.

BACKGROUND

This invention relates to a technique of processing data in a computer system, and more particularly, to a technique applicable to database management systems that have a system-switching function (failover function).

In any data base management system (hereinafter abbreviated as DBMS), localization of the effect of a failure and quick recovery of the system from the failure are important in order to improve the reliability of the system and raise the operating rate of the system. A technology that has conventionally been employed in DBMSs for quick system recovery from a failure is "system switching (failover)" in which a standby node is prepared separately from an active node, which executes services, and execution of the services is turned over to the standby system when a failure occurs in the active system.

A known countermeasure against DBMS failures is a technique of giving a system a hot standby configuration, so that the system can be run non-stop (see , for example, Jim Gray and Andreas Reuter, "Transaction Processing: Concepts and Techniques", pp. 646-648, 925-927, Morgan Kaufmann Publishers, 1992).

There has also been known an architecture in which a plurality of processors execute database processing to balance the database processing load among the processors. An example of this architecture is disclosed in David DeWitt and Jim Gray, "Parallel Database Processing: The Future of High Performance Database Systems", pp. 1-26, COMMUNICATIONS OF THE ACM, Vol. 35, N06, 1992. The publication discloses a shared-everything architecture as well as a shared-disk architecture (sharing architectures), and in this type of system, every disk is accessible to every node that performs DB processing. In a shared-nothing architecture (non-sharing architecture), each node can only access data stored in a disk that is connected to the node.

The above-mentioned prior art example discusses server pooling and the like in which one backup node is prepared for each active node, so that failover switching is made from an arbitrary node suffering a failure to a predetermined standby node. On the other hand, node addition and configuration change in terms of hardware have become easier due in part to the recent emergence of blade server, and software technology is now attracting attention which enables a DBMS to make full use of existing nodes in the system when a blade is added.

SUMMARY

A system that has the system switching function described above needs to prepare a standby node that is equal in performance to an active node, separately from the active server and for each and every active server. In a DBMS run on a plurality of nodes, as many standby nodes as the nodes running the DBMS are needed. A standby node is idle during normal execution of a service, which means low normal resource utilization rate in a system that needs dedicated standby resources (processor, memory, and the like) that are normally not in operation. This poses a problem to reduction of total cost of ownership (TCO) in building and running a system.

A failure requiring failover can be caused by various factors including a hardware failure and a performance failure resulting from an increase in processing load that slows down the system extremely. While the cause of a failure can be removed by simply switching systems to a standby node when it is a hardware failure or the like, a performance failure due to increased processing load is not as easily solved by failover since a standby node to which the switch is made may also fall into a performance failure.

This invention has been made to solve the above-mentioned problems, and it is therefore an object of this invention to provide a method of controlling computer system switching according to the cause of failure without needing to prepare one standby node for each active node unlike the prior art examples described above.

This invention provides a method of managing a computer system, the computer system including: a first computer system, which has a plurality of computers executing a task; and a second computer system, which has a plurality of computers to take the task executed by the computers of the first computer system over to the computers of the second computer system when a failure occurs in the computers of the first computer system, the method including: detecting a failure in one of the computers constituting the first computer system; choosing, based on the cause of the failure and performance information about the computers constituting the second computer system, one of the computers in the second computer system can be used for recovery from the failure; and handing the task that has been executed by the failed computer of the first system over to the chosen computer of the second computer system.

The computers constituting the second computer system is smaller in number than the computers constituting the first computer system.

This invention also provides a method of managing a computer system, the computer system including: a first computer system, which has a plurality of computers executing a task; and a second computer system, which has a plurality of computers to take the task executed by the computers of the first computer system over to the computers of the second computer system when a failure occurs in the computers of the first computer system, the method including: collecting operating state information which indicates the operating state of each computer in the first computer system; detecting, from the operating state information, a failure in one of the computers constituting the first computer system; detecting the cause of the failure from the operating state information; obtaining performance information about the performance of the computers constituting the second computer system; calculating, from the cause of the failure and the performance information, the performance information of a computer that can be used for recovery from the failure; changing one of the computers constituting the second computer system according to the calculated performance information; choosing the computer of the second computer system whose performance information is changed as a failover target of the first computer system; and handing the task that has been executed by the failed computer of the first system over to the chosen computer of the second computer system.

This invention where, for n active nodes (the computers of the first computer system), only m (which is smaller than n) standby nodes (the computers of the second computer system) are prepared, instead of preparing one specific standby node for each active node, can thus cut the running cost of an idle standby node by choosing, when a failure occurs, one out of the m standby nodes that is appropriate for the cause of the failure.

This invention also makes it possible to prevent the same failure cause from happening after failover by including nodes that have characteristics suitable for dealing with failure causes in the m standby nodes.

In addition, since a standby node computer whose performance is suitable for dealing with specifics of a failure is chosen to take over a database, this invention can avoid a situation in which the performance of a standby node computer that takes over a failed active node is overqualified and accordingly wasted.

BRIEF DESCRIPTION OF THE DRAWINGS

FIG. 6 is an explanatory diagram showing performance differences among backup nodes A to C.

FIG. 7 is an explanatory diagram showing a configuration example of a backup node priority table which is used to manage backup nodes.

FIG. 18 is an explanatory diagram showing a configuration example of a backup node management table which is used to manage backup nodes.

FIG. 19 is an explanatory diagram showing a configuration example of a DB information analysis table which is used in analyzing DB information to obtain a necessary resource and a necessary resource capacity.

DETAILED DESCRIPTION OF THE PREFERRED EMBODIMENTS

The best mode for carrying out this invention will be described below in detail with reference to the accompanying drawings.

First Embodiment

Figure 1:
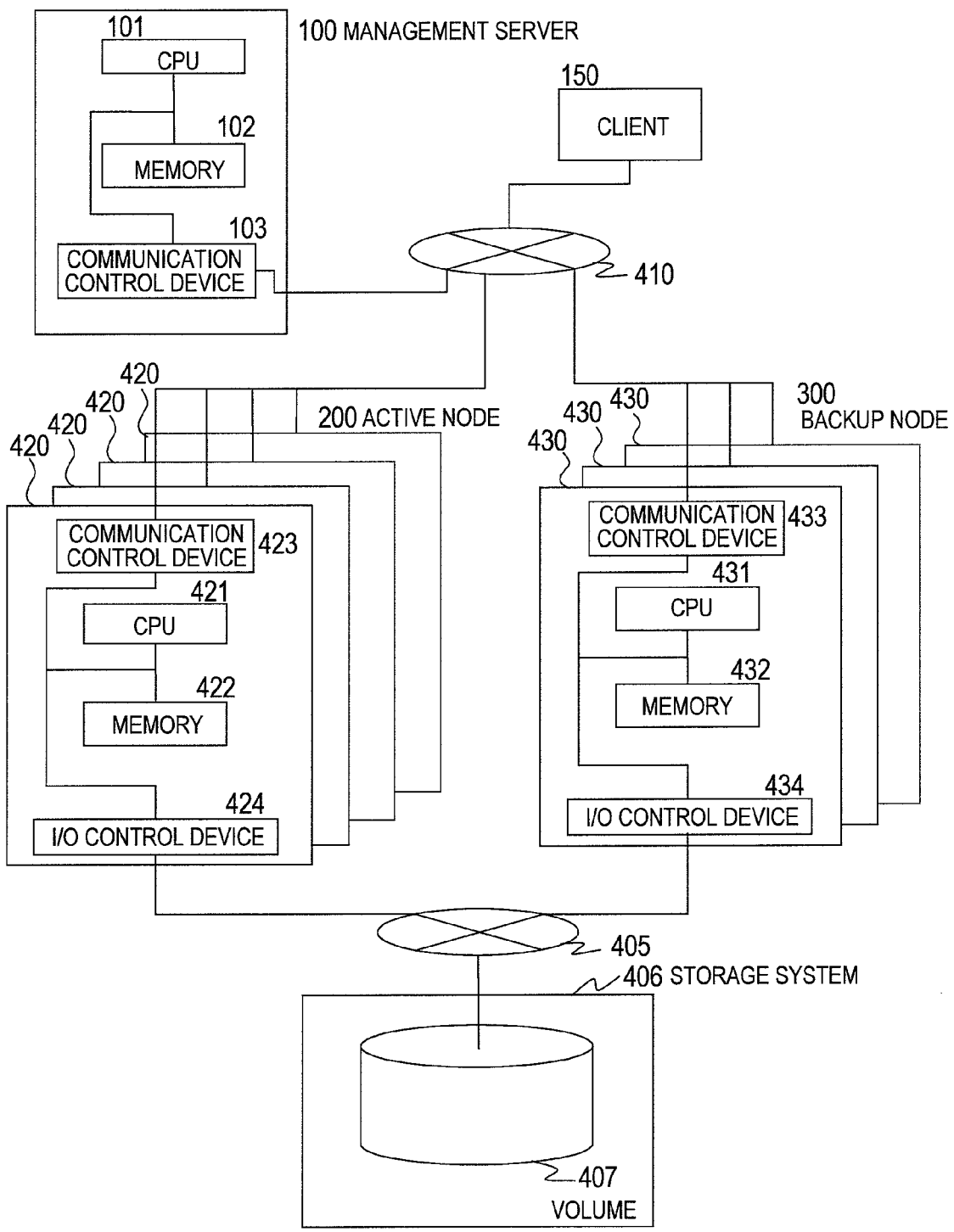
FIG. 1 is a block diagram of a computer system to which a first embodiment of this invention is applied.

FIG. 1 is a block diagram showing the hardware configuration of a computer system to which a first embodiment of this invention is applied.

In FIG. 1, a server 420, which constitutes an active node 200, a server 430, which constitutes a backup (standby) node 300, a management server 100, and a client computer 150 are connected to a network 410. The active node 200 handles a task. The backup node 300 takes over the task when a failure occurs in the active node 200. The management server 100 manages the active node 200 and the backup node 300. The client computer 150 accesses the active node 200. The network 410 is built from, for example, an IP network. The task can be a database management system, an application, or a service.

The management server 100 has a CPU 101, which performs computation processing, a memory 102, which stores programs and data, and a network interface 103, which communicates with another computer via the network 410. The CPU 101 is not limited to homogeneous processors, and heterogeneous processors may be employed for the CPU 101.

The active node 200 is composed of one or more servers 420. Each server 420 has a CPU 421, which performs computation processing, a memory 422, which stores a database processing program and data, a communication control device 423, which communicates with another computer via the network 410, and an I/O control device (host bus adapter) 424, which accesses a storage system 406 via a storage area network (SAN) 405.

The backup node 300 is composed of one or more servers 430 as is the active node 200, except that the total count of the servers 430 in the backup node 300 is set smaller than the total count of the servers 420 in the active node 200.

Each server 430 has a CPU 431, which performs computation processing, a memory 432, which stores a database processing program and data, a communication control device 433, which communicates with another computer via the network 410, and an I/O control device 434, which accesses the storage system 406 via the SAN 405.

The storage system 406 has a plurality of disk drives, and a volume 407 is set in the storage system 406 as a storage area accessible to the active node 200 and the backup node 300. A database 400, which will be described later, is stored in the volume 407.

Figure 2:
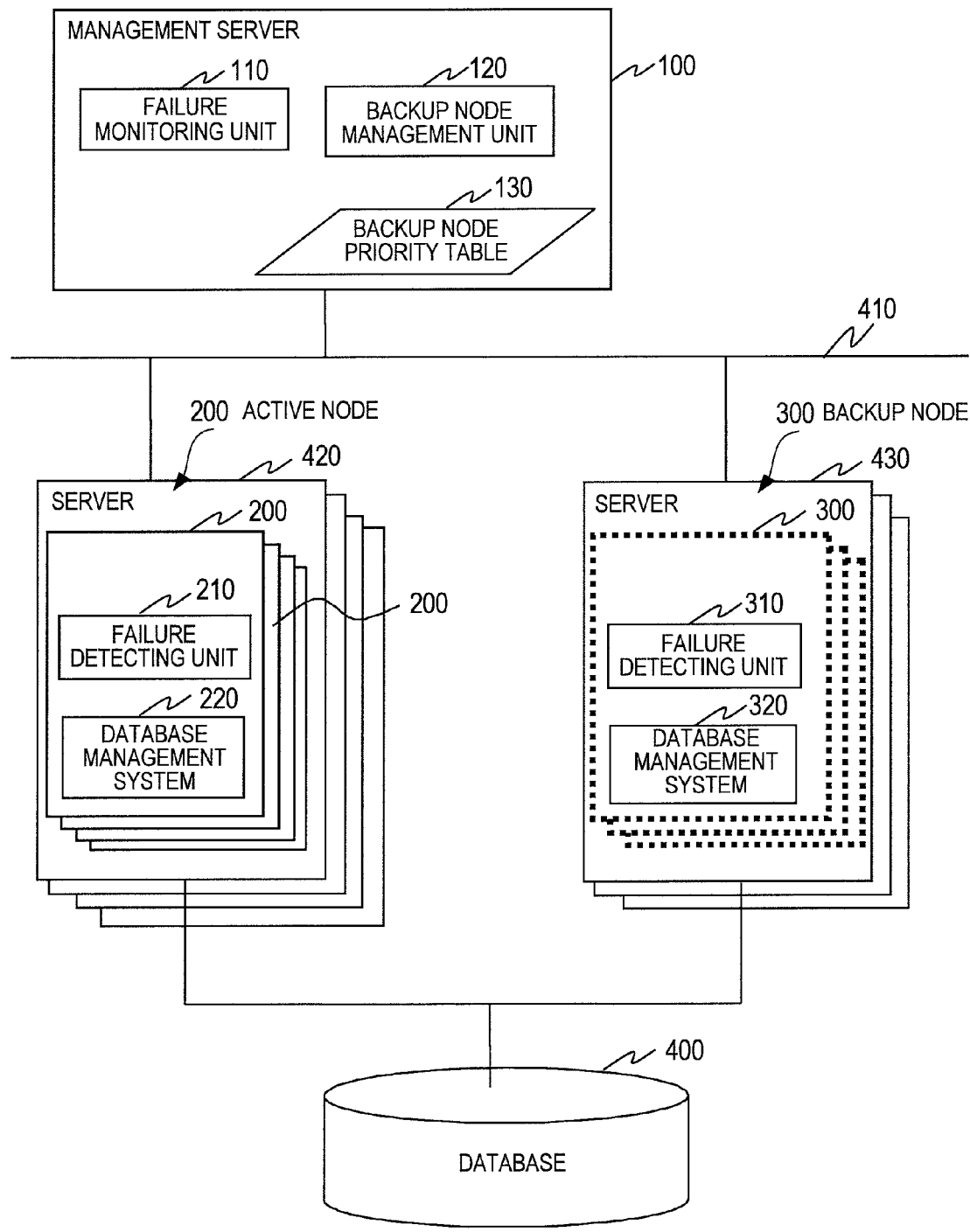
FIG. 2 is a block diagram showing a software configuration of a database management system that is executed in the computer system of FIG. 1.

FIG. 2 is a block diagram showing a software configuration of a database management system that is executed in the computer system of FIG. 1. Shown in this example is the configuration of a database system that can resume DB access processing after a failure in a manner that is suited to the cause of the failure. The database system in this embodiment is composed of one or more servers 420, one or more servers 430, and the management server 100 which are connected to one another via the network 410, and the database 400 which is connected to the server(s) 420 and the server(s) 430.

Each server 420 in the active node 200 is allocated and executes a failure detecting unit 210 and a database management system (DBMS) 220. The failure detecting unit 210 detects whether there is a failure in its own server 420 or not. The database management system 220 refers to or updates the database 400, which is stored in the volume 407 of the storage system 406, in response to a request from the client computer 150.

The database management system 220 divides the database 400 stored in the volume 407 of the storage system 406 into divided databases, and associates each divided database with one server 420 to perform data processing.

Each server 430 in the backup node 300 is allocated a failure detecting unit 310 and a database management system 320 similarly to the server 420 in the active node 200.

The management server 100, which manages the active node 200 and the backup node 300, is allocated a failure monitoring unit 110, which monitors information sent from the failure detecting unit 210 of each server 420 to monitor the operating state of each server 420, a backup node management unit 120, which manages the server(s) 430 in the backup node 300, and a backup node priority table 130, which is used to manage the server(s) 430 so that the backup node 300 can take over the management of the database when a failure occurs in the active node 200.

Figure 3:
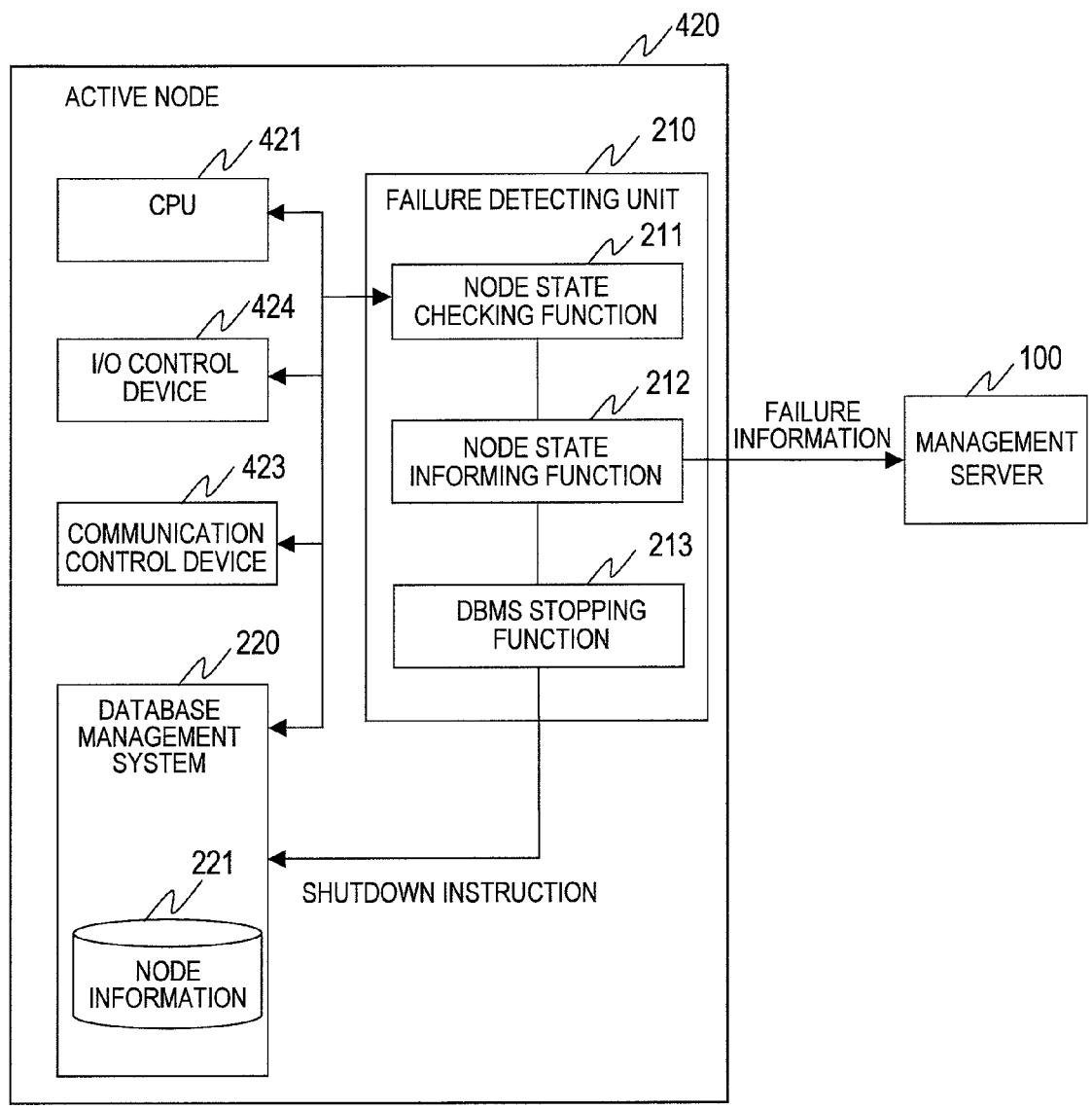
FIG. 3 is a block diagram of function elements of an active node to show the active node in more detail than in FIG. 2.

FIG. 3 is a block diagram of function elements of the active node 200 to show in more detail the active node 200 that has the configuration of FIG. 2. FIG. 3 shows one server 420 which constitutes one node in the active node 200.

The failure detecting unit 210 has a node state checking function 211, which monitors the state of the CPU 421, the I/O control device 424, the communication control device 423, and the database management system 220. When something is wrong with one of the devices listed above or the database management system 220, the node state checking function 211 uses a node state informing function 212 to send failure information to the management server 100, and uses a DBMS stopping function 213 to issue a shutdown instruction to the database management system 220.

The node state checking function 211 monitors the CPU 421 by, for example, detecting the utilization rate or load of the CPU 421. When a time period in which the utilization rate of the CPU 421 exceeds a given threshold (e.g., 99%) reaches a given length, the node state checking function 211 judges that an excessive load has caused a failure in the CPU 241. In other words, the node state checking function 211 judges that a failure has occurred when the CPU 421 is run at a 100% utilization rate for longer than a given length of time.

Factors related to the load of the CPU 421 that may put the DBMS 220 out of operation include:

an increase in transaction processing amount of the database 400 (increase in CPU occupancy (utilization) rate regarding execution processes of the database 400); and an increase in CPU occupancy rate of other processes than database processes.

The node state checking function 211 therefore monitors the CPU utilization rate of the whole system, the CPU utilization rate of DB processes, the length of a process execution queue to the CPU 421, the length of an executable process swap queue to the CPU 421, or the length of a message queue. When a monitored value exceeds a preset value (or meets a given condition), the node state checking function 211 judges that a failure has occurred. In the case of measuring other values than the utilization rate of the CPU 421, the measured value is compared against its normal value to use the rate of increase or the like in judging whether a failure has occurred or not.

The node state checking function 211 monitors the I/O control device 424 and the communication control device 423 by monitoring the throughput (the transfer rate or the communication rate). When the throughput (the I/O data amount per unit time) is below a preset threshold, the node state checking function 211 judges that a failure has occurred. Whether there has been a failure or not is judged simply from the rate of increase of the frequency of access to the storage system 406 or the frequency of access from the network 410 compared against its normal value.

The node state checking function 211 monitors the database management system 220 by monitoring the buffer hit rate with respect to a cache memory (not shown). When a measured buffer hit rate is below a present threshold, the node state checking function 211 judges that a failure has occurred. As is the case for the measured values mentioned above, whether there has been a failure or not is judged from the rate of increase of the frequency of access to the storage system 406 compared against its normal value.

The database management system 220 of each server 420 in the active node 200 holds node information 221, which is information about hardware and software of its own server 420. The node information 221 contains, for example, the performance and count of the CPUs 421, the capacity of the memory 422, an OS type, and the identifier of the node (node name).

Figure 4:
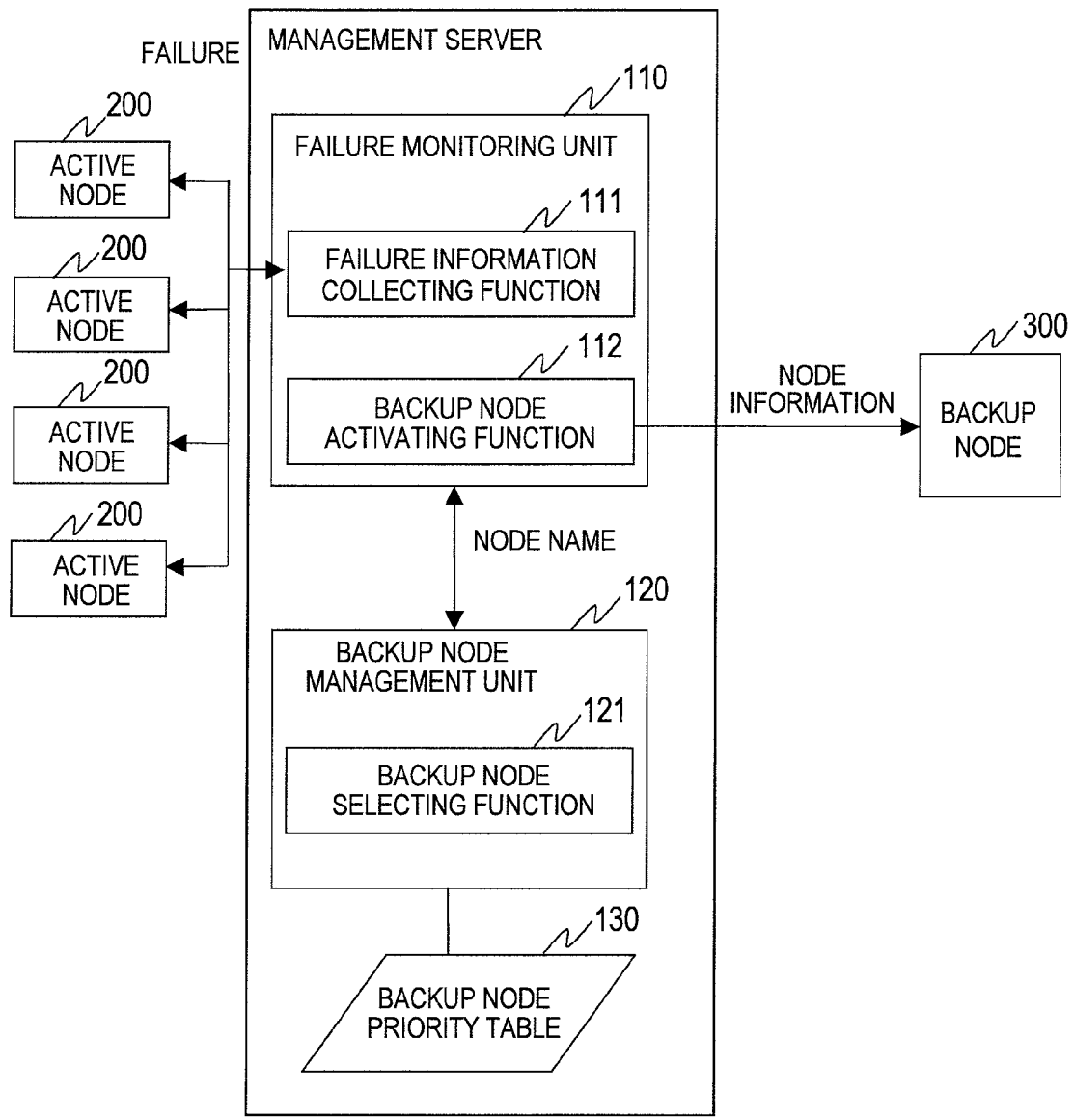
FIG. 4 is a block diagram showing in detail function elements of a management server.

FIG. 4 is a block diagram showing in detail function elements of the management server 100 that has the configuration of FIG. 2. The failure monitoring unit 110 uses a failure information collecting function 111 to receive failure information that is sent from each node of the active node 200. The failure information collecting function 111 sends the received failure information and the name of the node where the failure has occurred to the backup node management unit 120.

The backup node management unit 120 uses a backup node selecting function 121 to determine which node (server 430) in the backup node 300 is to serve as a failover target based on the backup node priority table 130 and failure information. After allocating the backup node that is determined as a failover target to the active node 200, the backup node selecting function 121 deletes information of this backup node from the backup node priority table 130. A backup node activating function 112 sends, to the node in the backup node 300 that is determined as a failover target, information of the failover source node and an instruction to activate the database management system 320.

Figure 5:
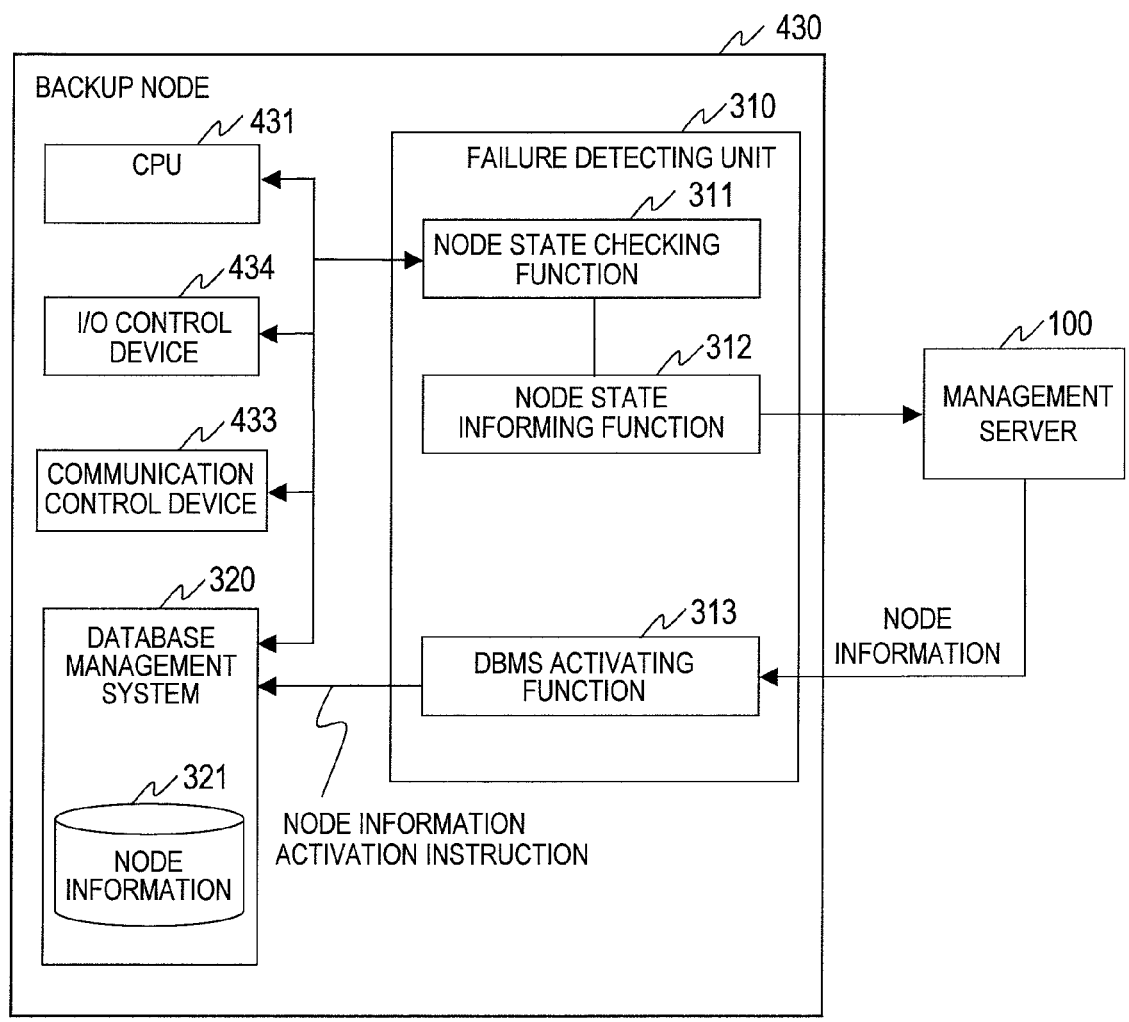
FIG. 5 is a block diagram showing in detail function elements of a backup node.

FIG. 5 is a block diagram showing in detail function elements of the backup node 300 that has the configuration of FIG. 2. Shown in FIG. 5 is one server 430 which constitutes one node in the backup node 300. Of functions of the failure detecting unit 310 in the backup node 300, a node state checking function 311 and a node state informing function 312 are similar to the node state checking function 211 and the node state informing function 212 in the active node 200, respectively.

A DBMS activation processing function 313 (DBMS activating function 313) of the failure detecting unit 310 receives, from the management server 100, an instruction to activate the database management system 320 and failover source node information. The DBMS activation processing function 313 hands over node information that is obtained from a failover source node in the active node 200 to the database management system 320, and instructs the database management system 320 to boot up.

FIGS. 6 and 7 show an example of when the backup node 300 is composed of a backup node A, a backup node B, and a backup node C. FIG. 6 is an explanatory diagram showing performance differences among the backup nodes A to C. FIG. 7 shows a configuration example of the backup node priority table 130 which is used to manage backup nodes.

In the example of FIG. 6, the performance differences among the backup nodes A to C are differences in CPU performance, I/O performance, and communication performance. The backup node A has the highest CPU performance, and the backup node B and the backup node C follow in the stated order. The backup node C is the highest in I/O performance, followed by the backup node A and then by the backup node B. The backup node B has the highest communication performance, with the backup node C and the backup node A taking the second place and the third place, respectively.

FIG. 7 shows an example of the backup node priority table 130 that is created from the performance differences among backup nodes of FIG. 6. The backup node priority table 130 holds, for each backup node name (or identifier) 131, the order of the node's CPU performance in the backup node 300 in a field for a CPU load 132, the order of the node's I/O performance in the backup node 300 in a field for an I/O load 133, the order of the node's communication performance in a field for a communication failure 134, and an order of choosing nodes (servers 430) when a failure occurs in the DBMS in a field for a DBMS failure 135. The orders in those fields are set such that a smaller value indicates a higher priority level.

When a failure occurs in one node in the active node 200, the backup node management unit 120 determines which node in the backup node 300 is to serve as a failover target based on the cause of this failure and the backup node priority table 130. For example, when the cause of failure is the CPU load 132, the node A is chosen according to the order of priority set in the backup node priority table 130. The node C is chosen when the cause of failure is the I/O load 133, whereas the node B is chosen when the cause of failure is the communication failure 134. When the cause of failure is the DBMS failure 135, the node B is a chosen failover target.

Desirably, the servers 420 in the active node 200 all have equal CPU performance, equal I/O performance, and equal communication performance. Once a failure occurs, the load may be varied from one server 420 to another. It is therefore desirable to build the backup node 300 such that the performance level varies among the servers 430 as shown in FIGS. 6 and 7. The performance standard of the nodes A to C, which constitute the backup node 300 in FIG. 6, can be set according to the building cost of the backup node 300. For instance, in the case where the cost is not much of a concern, the performance of the active node 200 is set as a low performance level for the backup node 300. In the case where a limited cost is allotted to construction of the backup node 300, the performance of the active node 200 is set as an intermediate performance level for the backup node 300. The backup node 300, which in the example of FIGS. 6 and 7 is composed of three nodes, A to C, may be composed of a large number of nodes and contain a plurality of servers 430 that have the same performance level.

Figure 8:
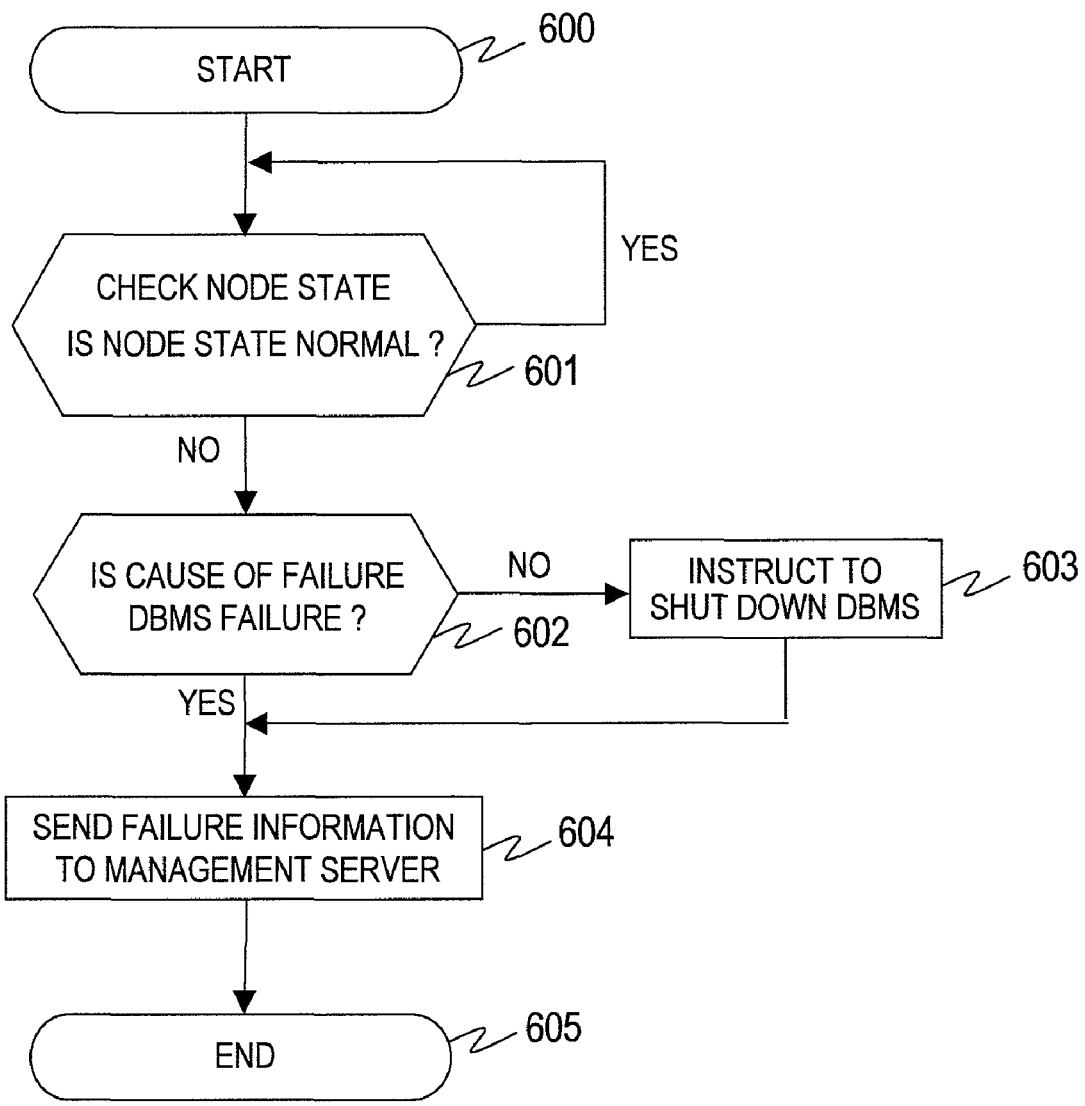
FIG. 8 is a flow chart for a processing procedure that is executed in an active node when a failure occurs.

FIG. 8 is a flow chart for a processing procedure that is executed when a failure occurs in the active node 200 according to this embodiment.

The node state checking function 211 of the active node 200 checks, in Step 601, the processing load of the CPU 421, the processing load of the I/O control device 424, the communication load of the communication control device 423, and the database management system 220 to find out whether they are in a normal state. When they are in a normal state, the node state checking function 211 repeats Step 601 at regular time intervals. When any of the checked items is not in a normal state, the procedure advances to Step 602.

In Step 602, whether the cause of failure is a DBMS failure or not is checked. When the cause of failure is a DBMS failure (shutdown or processing delay of the DBMS), it means that the database management system 220 has been shutdown abnormally, and the procedure advances to Step 604, where specifics of the failure are sent to the management server 100.

When the cause of failure is not a DBMS failure in Step 602, it means that the database management system 220 itself is operating normally, and the procedure advances to Step 603. In Step 603, a shutdown instruction is issued to the database management system 220 and the database management system 320 is shut down. The procedure then advances to Step 604, where specifics of the failure and node information are sent to the management server 100.

Figure 9:
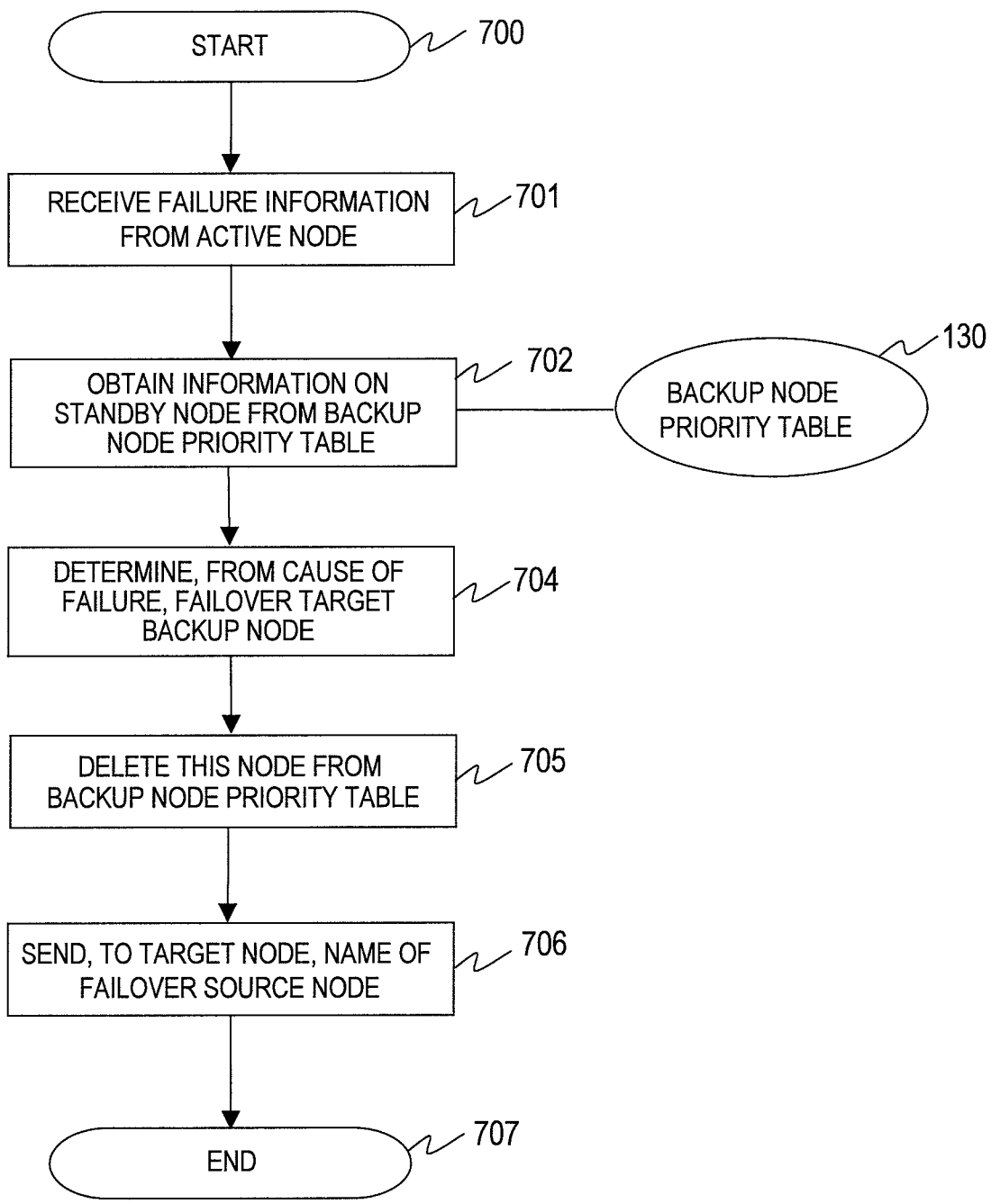
FIG. 9 is a flow chart for a processing procedure that is executed when the management server receives failure information from an active node.

FIG. 9 is a flow chart for a processing procedure that is executed when the management server 100 receives failure information from the active node 200.

The failure information collecting function 111 of the management server 100 receives, in Step 701, failure information from the active node 200. In Step 702, the backup node selecting function 121 obtains information in the backup node priority table 130 to determine, in Step 704, based on the cause of failure obtained from the failure information, which node in the backup node 300 is to serve as a failover target. In Step 705, information of the node in the backup node 300 that is determined as a failover target is deleted from the backup node priority table 130. The backup node activating function 112 sends, in Step 706, node information of the failed node in the active node 200 and a backup node activation instruction to the node in the backup node 300 that is determined as a failover target.

Figure 10:
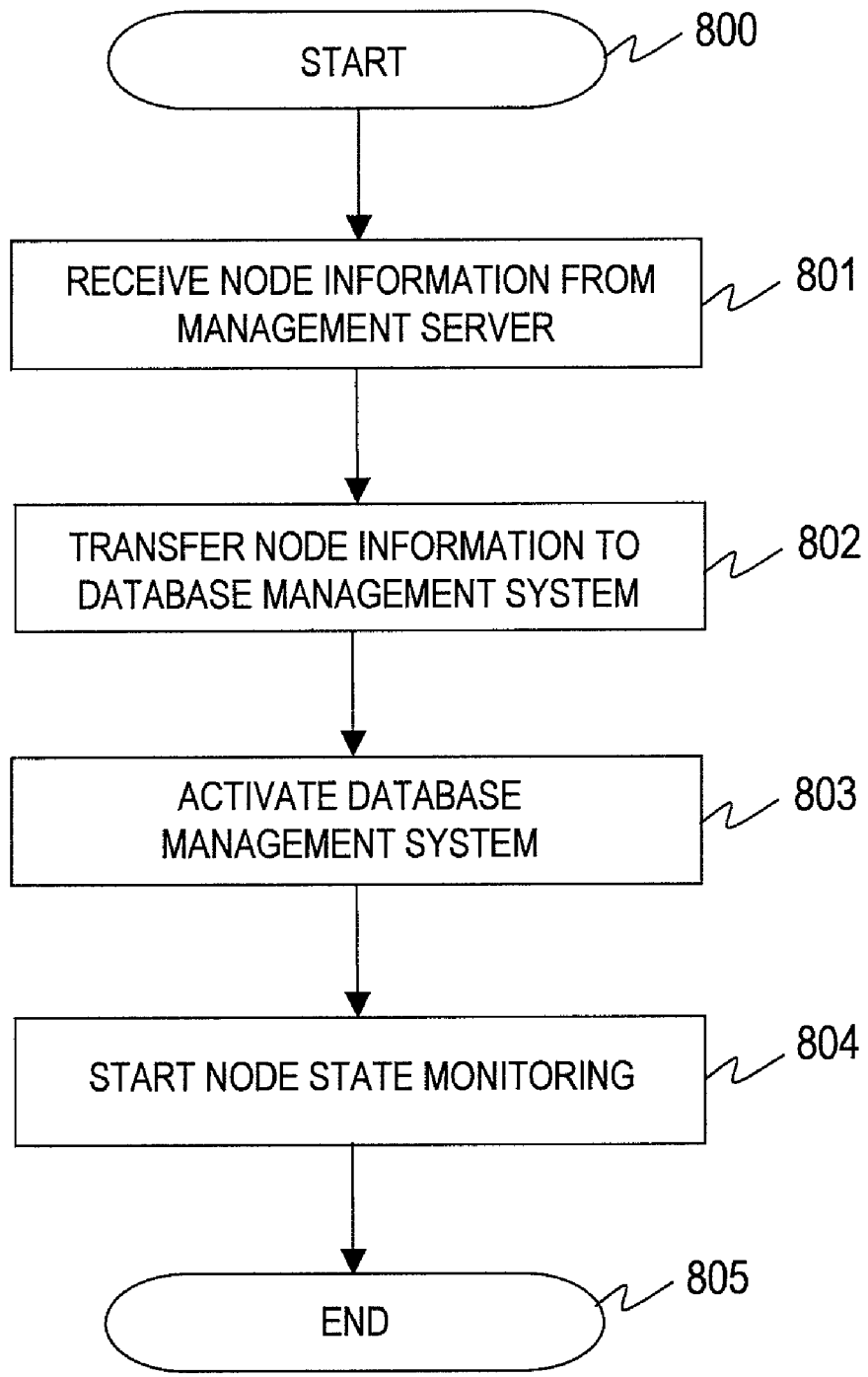
FIG. 10 is a flow chart for a processing procedure that is executed when a backup node receives node information and an activation notification from the management server.

FIG. 10 is a flow chart for a processing procedure that is executed when the backup node 300 receives node information and activation instruction from the management server 100.

The DBMS activating function 313 of the backup node 300 receives, in Step 801, from the management server 100, node information of a failed node in the active node 200. In Step 802, the received node information is transferred to the database management system 320, which sets information of the failed node in the active node 200. In Step 803, the DBMS activating function 313 issues an activation instruction to the database management system 320 and activates the database management system 320. After the database management system 320 finishes booting up, the failure detecting unit 310 starts node state checking in Step 804, whereby failover from the active node 200 to the backup node 300 is completed and the backup node 300 now serves as an active node.

Figure 11:
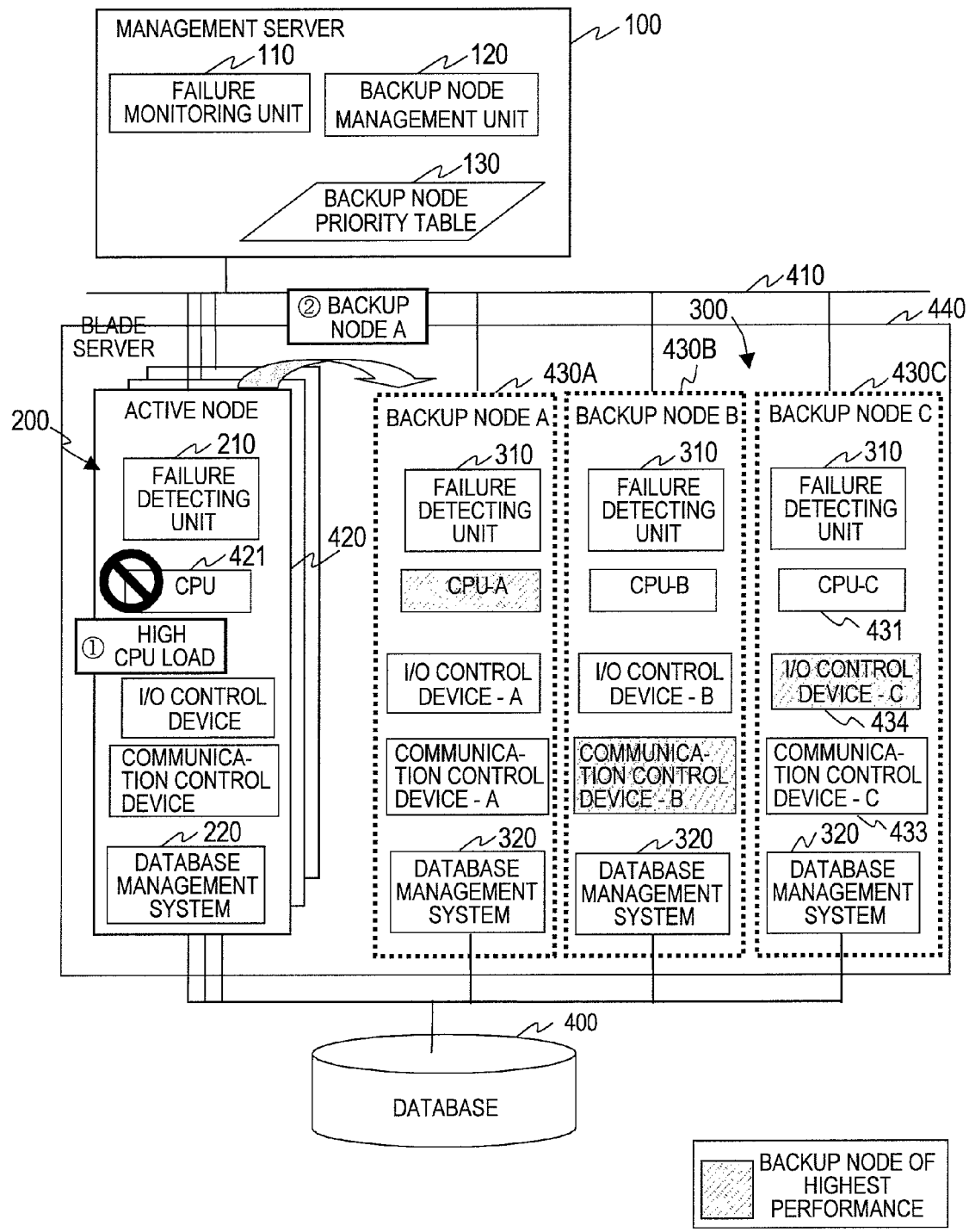
FIG. 11 is a block diagram showing failover processing for when a failure occurs in an active node.

FIG. 11 shows the system configuration of a database management system that has as a backup node A 430A, a backup node B 430B, and a backup node C 430C as the backup node 300 shown in FIGS. 6 and 7. The database management system here is run on one or more active servers 420 and three backup servers 430 (430A to 430C) which are inserted in a blade server 440.

The management server 100 in FIG. 11 is placed outside of the blade server 440 but may be a server inserted in the blade server 440.

The active server 420 normally performs DB access processing. Described here is how any active server 420 operates when a heavy load is applied to its CPU.

In the case where heavy load is applied to the CPU 421 while the active server 420 is carrying out DB access processing, the failure detecting unit 210 of the active server 420 judges that something is wrong with the CPU 421. Since the cause of failure is not a DBMS failure, the failure detecting unit 210 shuts down the database management system 220 running on the active server 420. The failure detecting unit 210 then sends failure information about the failure in the active server 420 to the management server 100.

Receiving the failure information from the active node 200, the failure monitoring unit 110 hands over the failure information to the backup node management unit 120 in order to determine which server in the backup node 300 is to serve as a failover target. The backup node management unit 120 refers to the backup node priority table 130 of FIG. 7 and determines the backup node A 430A, whose priority level is 1 when the cause of failure is the CPU load, as a failover target. The backup node management unit 120 then deletes information of the backup node A 430A from the backup node priority table 130. The failure monitoring unit 110 sends node information of the failover source server in the active node 200 and a database management system activation instruction to the backup node A 430A determined as a failover target.

The backup node A 430A receives from the management server 100 the node information of the failover source server in the active node 200 and the database management system activation instruction, and sends the received node information to the database management system 320. After setting the database management system 320 according to the node information, the backup node A 430A performs processing of activating the database management system 320. Once the activation processing is finished, the database management system 320 instructs the failure detecting unit 310 to start failure monitoring. Receiving the instruction, the failure detecting unit 310 starts monitoring for a failure, whereby the failover processing is completed.

In this way, when a failure occurs in the active node 200, a backup node server that is suitable for the cause of this particular failure is allocated, here, the server 430A of the backup node 300. Constructing the backup node 300 from servers of different performance levels, such as the servers 430A to 430C, makes it possible to choose the optimum server 430 as a failover target in light of the type of cause of failure in the active node 200. By choosing from the servers 430A to 430C in the backup node 300 one with a given performance that can remove the cause of failure, recovery from the failure is ensured. The given performance is the CPU performance, the I/O performance, the communication performance, or the like, and a relative priority order of choosing the servers 430A to 430C is set for each cause of failure as shown in FIG. 7. The priority order specific to cause of failure is set in advance according to the aforementioned performance differences among the servers 430A to 430C.

The count of the servers 430 in the backup (standby) node 300 can be set smaller than the count of the servers 420 in the active node 200 since it is rare that every server 420 in the active node 200 experiences a failure concurrently. Thus the failure resistance can be improved while cutting the cost of building and running the backup node 300.

Second Embodiment

Figure 12:
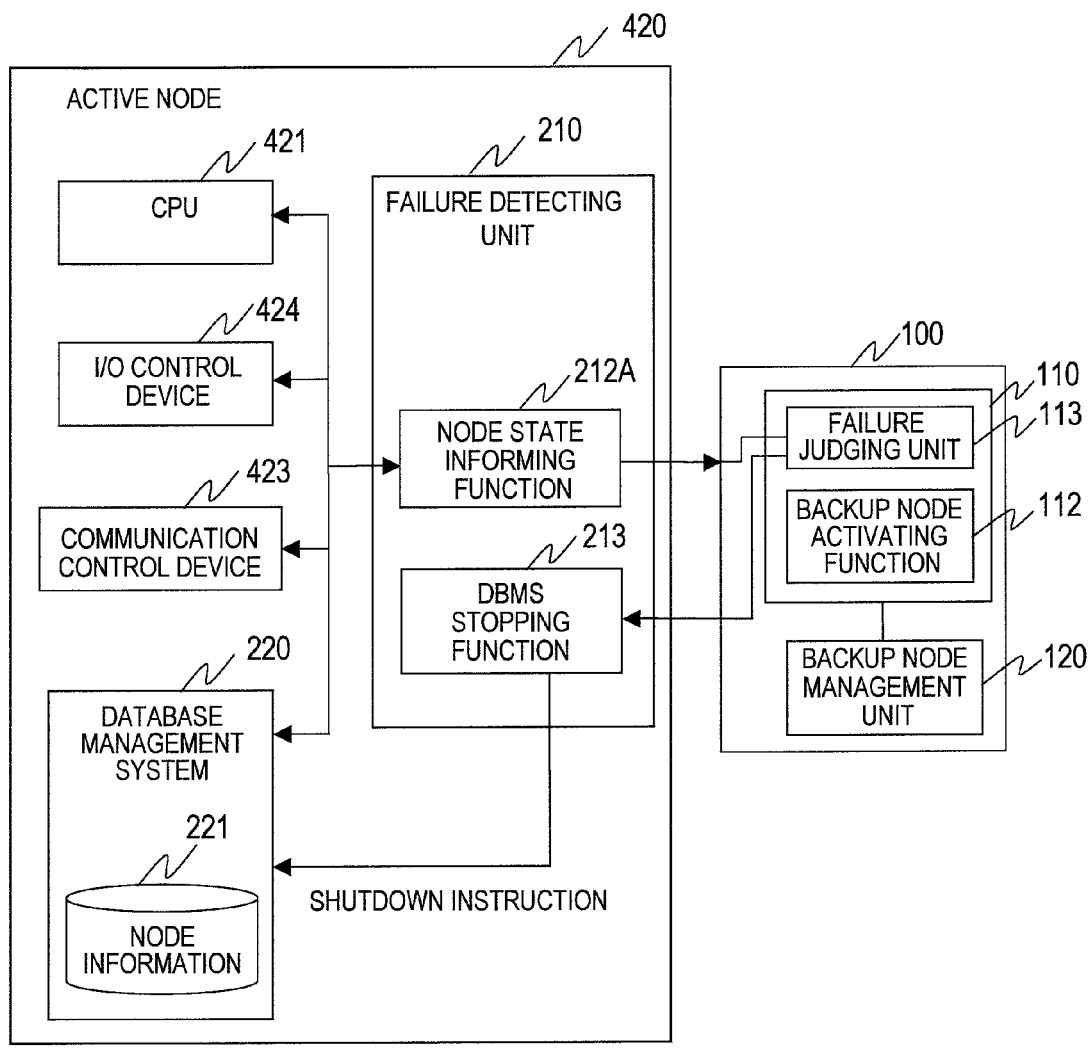
FIG. 12 is a block diagram showing an active node and a management server which are a part of a database management system according to a second embodiment.

FIG. 12 shows a second embodiment in which the failure occurrence judging function of the first embodiment is moved from the server 420 of the active node 200 to the management server 100, whereas the rest of the configuration remains the same as the first embodiment.

A node state checking function 212A is run in the server 420 of the active node 200 to monitor the CPU 421, the I/O control device 424, the communication control device 423, and the database management system 220, and to notify the management server 100 of the monitored operating state. The node state checking function 212A monitors the operating state of the devices and the database management system at regular intervals.

A failure judging unit 113 is run in the failure detecting unit 110 of the management server 100 to compare the operating state collected from each server 420 against preset thresholds and to judge whether there has been a failure or not. Detecting a failure, the failure judging unit 113 sends a shutdown instruction to the DBMS stopping function 213 in the failed server 420 if necessary. The rest is the same as in the first embodiment.

By thus centralizing the failure occurrence judging process in the management server 100 instead of making the servers 420 in the active node 200 individually judge for themselves, the processing load can be reduced in each server 420 and resources in each server 420 can be used more effectively.

Third Embodiment

Figure 13:
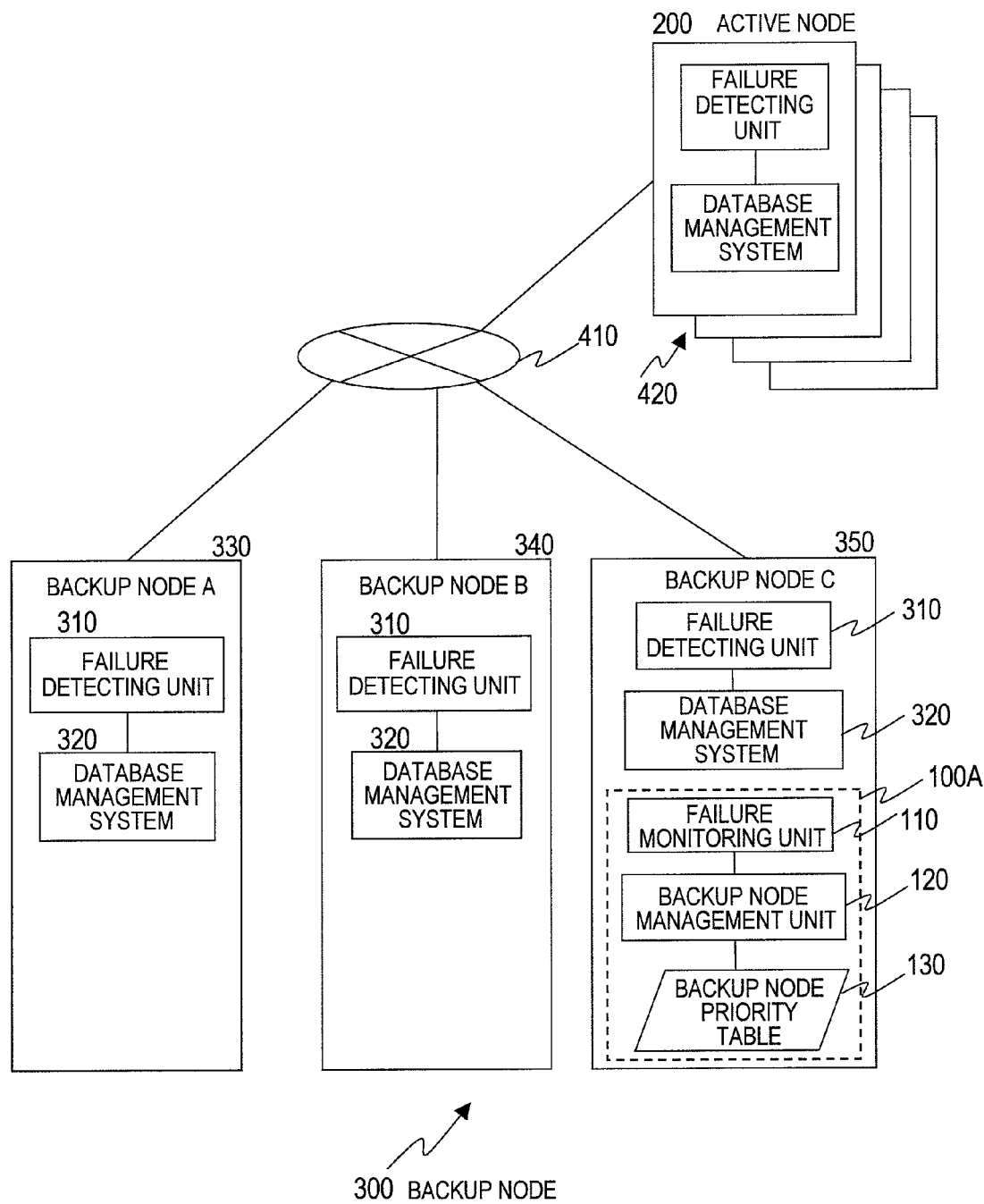
FIG. 13 is a block diagram showing a configuration of a database management system according to a third embodiment.

FIG. 13 shows a third embodiment in which one of the servers in the active node 200 executes the functions of the management server 100 of the first embodiment, thereby eliminating the need for the physical management server 100.

The backup node 300 is composed of three servers, 430A to 430C, as in the first embodiment. The servers 430A to 430C each have the failure detecting unit 310 and the database management system 320. One of the servers in the backup node 300, the server 430C, executes a management unit 100A, which provides functions similar to those of the management server 100 of the first embodiment.

The management unit 100A is configured the same way as the management server 100 of the first embodiment, and has the failure monitoring unit 110, which monitors failure information of the active node 200, the backup node management unit 120, which manages the backup node 300, and the backup node priority table 130, which is used to manage the order of the servers 430A to 430C to take over the task (the database management system).

The backup node 300 merely stands by in anticipation for a failure as long as the active node 200 is working normally. The backup node 300 can therefore afford to assign one of the servers 430A to 430C as the management unit 100A, thereby eliminating the need for the physical management server 100. This helps to make most of computer resources of the active node 200 and the backup node 300.

Fourth Embodiment

Figure 14:
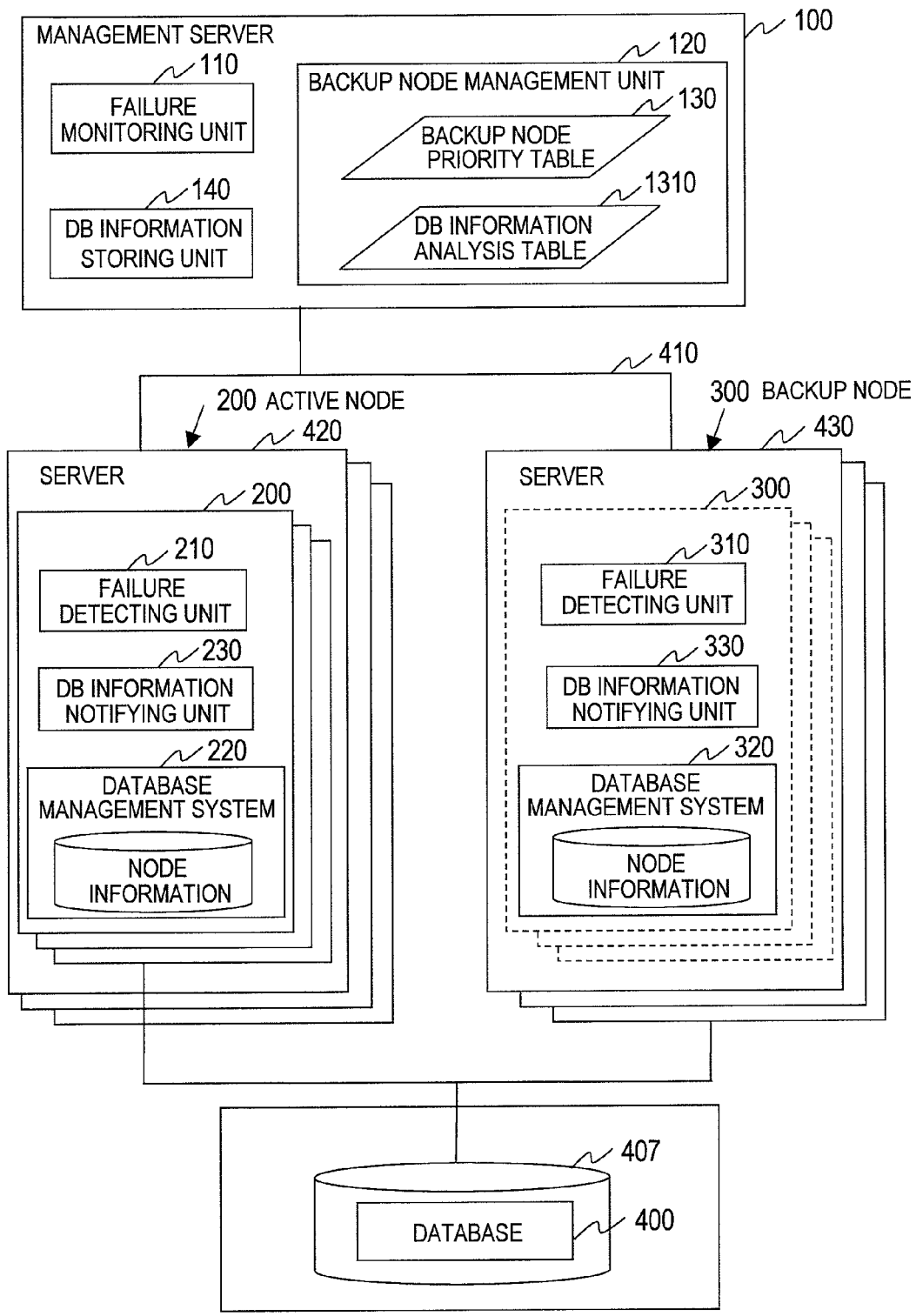
FIG. 14 is a block diagram showing a software configuration of a database management system that is executed in the computer system of FIG. 1 according to a fourth embodiment.

FIG. 14 is a block diagram showing the software configuration of a database management system that is executed according to a fourth embodiment in the computer system of FIG. 1 which has been described in the first embodiment. The fourth embodiment shows the configuration of a database system that can resume DB access processing after a failure in a manner that is suited to the cause of the failure. The database system in this embodiment is composed of one or more servers 420, one or more servers 430 and the management server 100 which are connected to one another via a network 410, and a database 400 which is connected to the server(s) 420 and the server(s) 430.

Each server 420 in an active node 200 is allocated and executes a failure detecting unit 210, a database management system (DBMS) 220, and a DB information notifying unit 230. The failure detecting unit 210 detects whether there is a failure in its own server 420 or not. The database management system 220 refers to or updates the database 400, which is stored in a volume 407 of a storage system 406, in response to a request from a client computer 150. The DB information notifying unit 230 collects internal information of the DBMS 220. DB information, which is internal information of a DBMS, is constituted of, for example, the cache memory hit rate, the log buffer overflow count, and the DB processing process (thread) down count per unit time.

The database management system 220 divides the database 400 stored in the volume 407 of the storage system 406 into divided databases, and associates each divided database with one server 420 to perform data processing.

Each server 430 in the backup node 300 is allocated a failure detecting unit 310, a database management system 320, and a DB information notifying unit 330 similarly to the server 420 in the active node 200.

The management server 100, which manages the active node 200 and the backup node 300, is allocated a failure monitoring unit 110, which monitors information sent from the failure detecting unit 210 of each server 420 and information sent from the DB information notifying unit 230 of each server 420 to monitor the operating state of each server 420, and a backup node management unit 120, which manages the server(s) 430 in the backup node 300. The backup node management unit 120 is allocated a DB information analysis table 131 and a backup node management table 1300. The DB information analysis table 131 is used to calculate, when a failure occurs in the active node 200, the spec. (specification information) of a necessary backup node from information that is sent from the DB information notifying unit 230 of each server 420. The backup node management table 1300 is used to manage the server(s) 430 so that the backup node 300 can take over the management of the database when a failure occurs in the active node 200. The management server 100 also has a DB information storing unit 140 where the state of the database management system 220 which is obtained from the DB information notifying unit 230 of each server 420 is stored.

Figure 15:
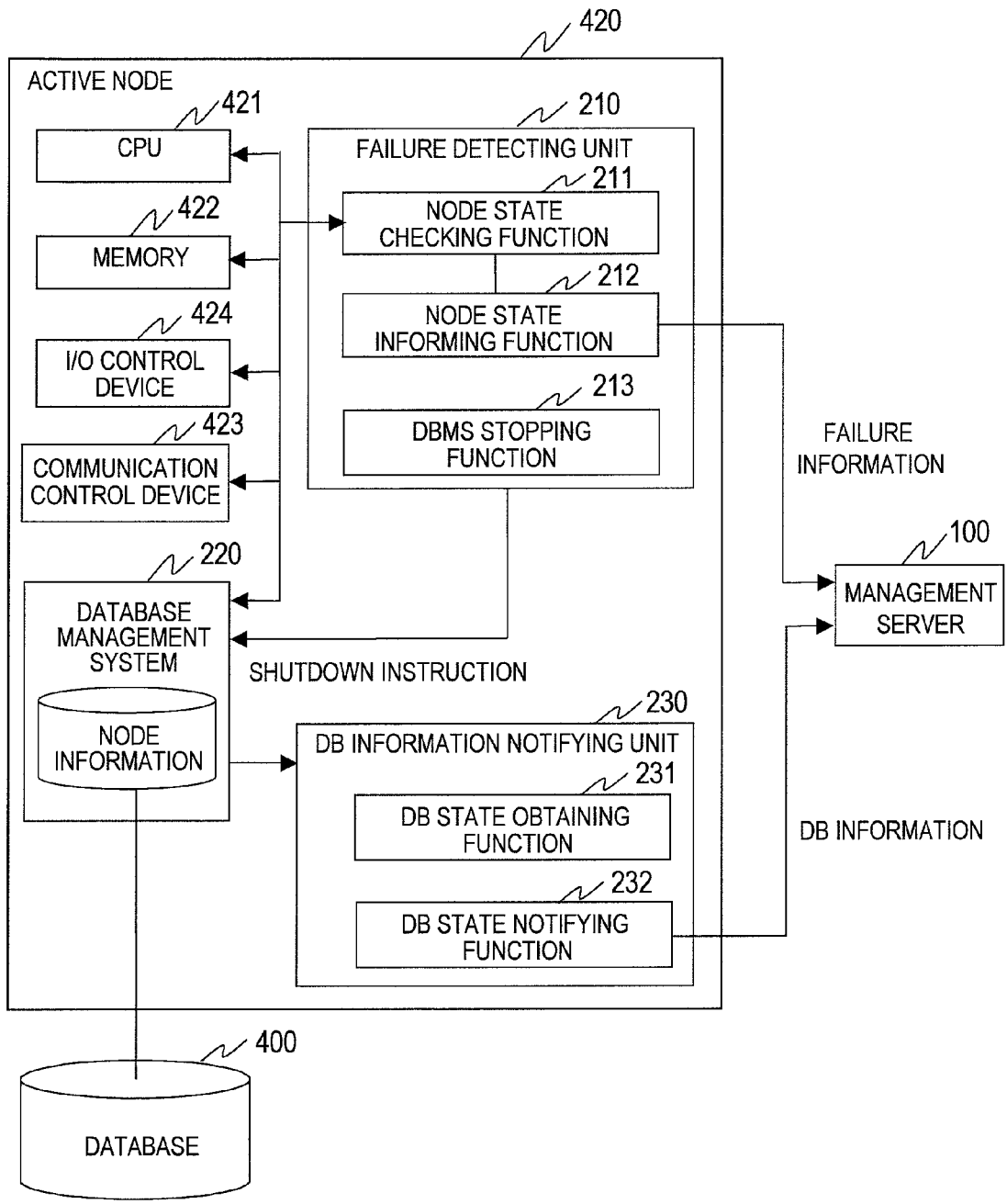
FIG. 15 is a block diagram of function elements of an active node to show the active node in more detail than in FIG. 14.

FIG. 15 is a block diagram of function elements of the active node 200 to show in more detail the active node 200 that has the configuration of FIG. 14. FIG. 15 shows one server 420 which constitutes one node in the active node 200.

The failure detecting unit 210 has a node state checking function 211, which monitors the state of the CPU 421, the memory 422, the I/O control device 424, the communication control device 423, and the database management system 220. When something is wrong with one of the devices listed above or the database management system 220, the node state checking function 211 uses a node state informing function 212 to send failure information to the management server 100, and uses a DBMS stopping function 213 to issue a shutdown instruction to the database management system 220.

The node state checking function 211 monitors the CPU 421 by, for example, detecting the utilization rate or load of the CPU 421. When a time period in which the utilization rate of the CPU 421 exceeds a given threshold (e.g., 99%) reaches a given length, the node state checking function 211 judges that an excessive load has caused a failure in the CPU 241. In other words, the node state checking function 211 judges that a failure has occurred when the CPU 421 is run at a 100% utilization rate for longer than a given length of time.

Factors related to the load of the CPU 421 that may put the DBMS 220 out of operation include:

an increase in transaction processing amount of the database 400 (increase in CPU occupancy (utilization) rate regarding execution processes of the database 400); and an increase in CPU occupancy rate of other processes than database processes.

The node state checking function 211 therefore monitors the CPU utilization rate of the whole system, the CPU utilization rate of DB processes, the length of a process execution queue to the CPU 421, the length of an executable process swap queue to the CPU 421, or the length of a message queue. When a monitored value exceeds a preset value (or meets a given condition), the node state checking function 211 judges that a failure has occurred. In the case of measuring other values than the utilization rate of the CPU 421, the measured value is compared against its normal value to use the rate of increase or the like in judging whether a failure has occurred or not.

The node state checking function 211 monitors the I/O control device 424 and the communication control device 423 by monitoring the throughput (the transfer rate or the communication rate). When the throughput (the I/O data amount per unit time) is below a preset threshold, the node state checking function 211 judges that a failure has occurred. Whether there has been a failure or not is judged simply from the rate of increase of the frequency of access to the storage system 406 or the frequency of access from the network 410 compared against its normal value.

The node state checking function 211 monitors the database management system 220 by monitoring the buffer hit rate with respect to a cache memory (not shown). When a measured buffer hit rate is below a present threshold, the node state checking function 211 judges that a failure has occurred. As is the case for the measured values mentioned above, whether there has been a failure or not is judged from the rate of increase of the frequency of access to the storage system 406 compared against its normal value. The cache memory (or a DB cache or a DB interior buffer) and a log buffer are set in a given area of the memory 422. The log buffer temporarily stores a database operation history log created by the database management system 220.

The DB information notifying unit 230 has a DB state obtaining function 231, which collects DB information of the database management system 220 regularly, and a DB state notifying function 232, which sends the collected DB information to the management server 100.

The DB state obtaining function 231 collects the following DB information from the DBMS 220:

message queue overstay time;
excess DB processing process down count per unit time;
excess exclusive timeout count;
UAP (SQL) execution overtime;

excess exclusive competition count;
log buffer overflow count; and
DB input/output buffer hit rate.

The database management system 220 of each server 420 in the active node 200 holds node information 221, which is information about hardware and software of its own server 420. The node information 221 contains, for example, the performance and count of the CPUs 421, the capacity of the memory 422, an OS type, and the identifier of the node (node name).

Figure 16:
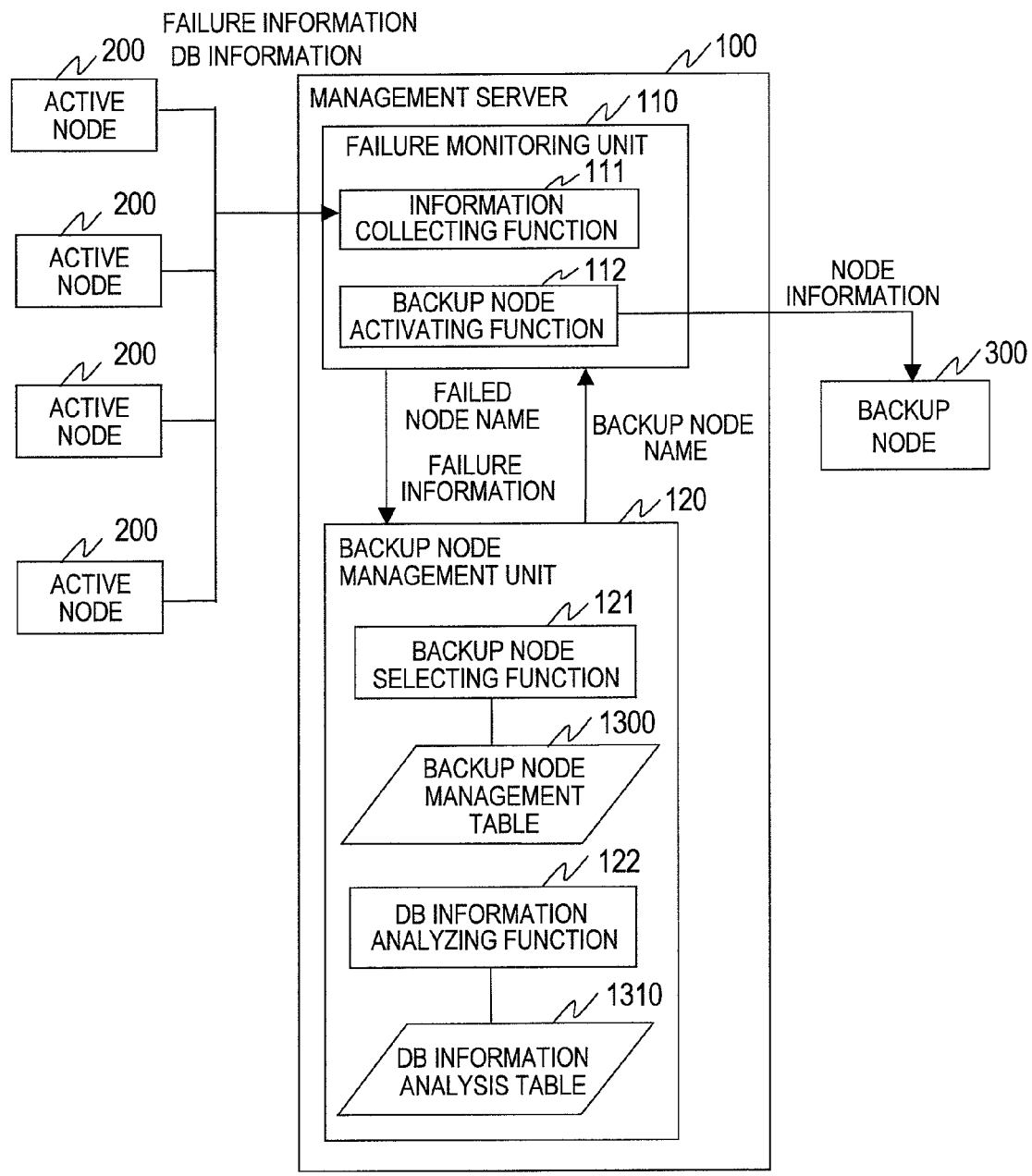
FIG. 16 is a block diagram showing in detail function elements of a management server.

FIG. 16 is a block diagram showing in detail function elements of the management server 100 that has the configuration of FIG. 14. The failure monitoring unit 110 uses an information collecting function 111 to receive failure information and DB information that are sent from each node of the active node 200. The information collecting function 111 sends the received failure information and the name of the node where the failure has occurred to the backup node management unit 120, along with the received DB information.

The backup node management unit 120 uses a DB information analyzing function 122 to calculate a spec. necessary as the backup node 300 based on the DB information analysis table 131, the DB information, and the node information of the failed node. A backup node selecting function 121 chooses, from the backup node management table 1300, a node (server 430) in the backup node 300 that has the closest spec. to the backup node spec. calculated by the DB information analyzing function 122.

In determining which node in the backup node 300 has the closest spec. to the calculated spec., the backup node selecting function 121 chooses the server 430 that has the lowest spec. (performance) out of the servers 430 in the backup node 300 that satisfy the spec. calculated by the backup node management unit 120. For instance, when the calculated spec. dictates that the CPU performance is 120% and the backup node 300 has the servers 430 whose CPU performance is 100%, 130%, and 150%, the server 430 that has a 130% CPU performance is chosen.

After allocating the backup node that is determined as a failover target to the active node 200, the backup node selecting function 121 deletes information of this backup node from the backup node management table 1300. A backup node activating function 112 sends, to the node in the backup node 300 that is determined as a failover target, information of the failover source node and an instruction to activate the database management system 320.

Figure 17:
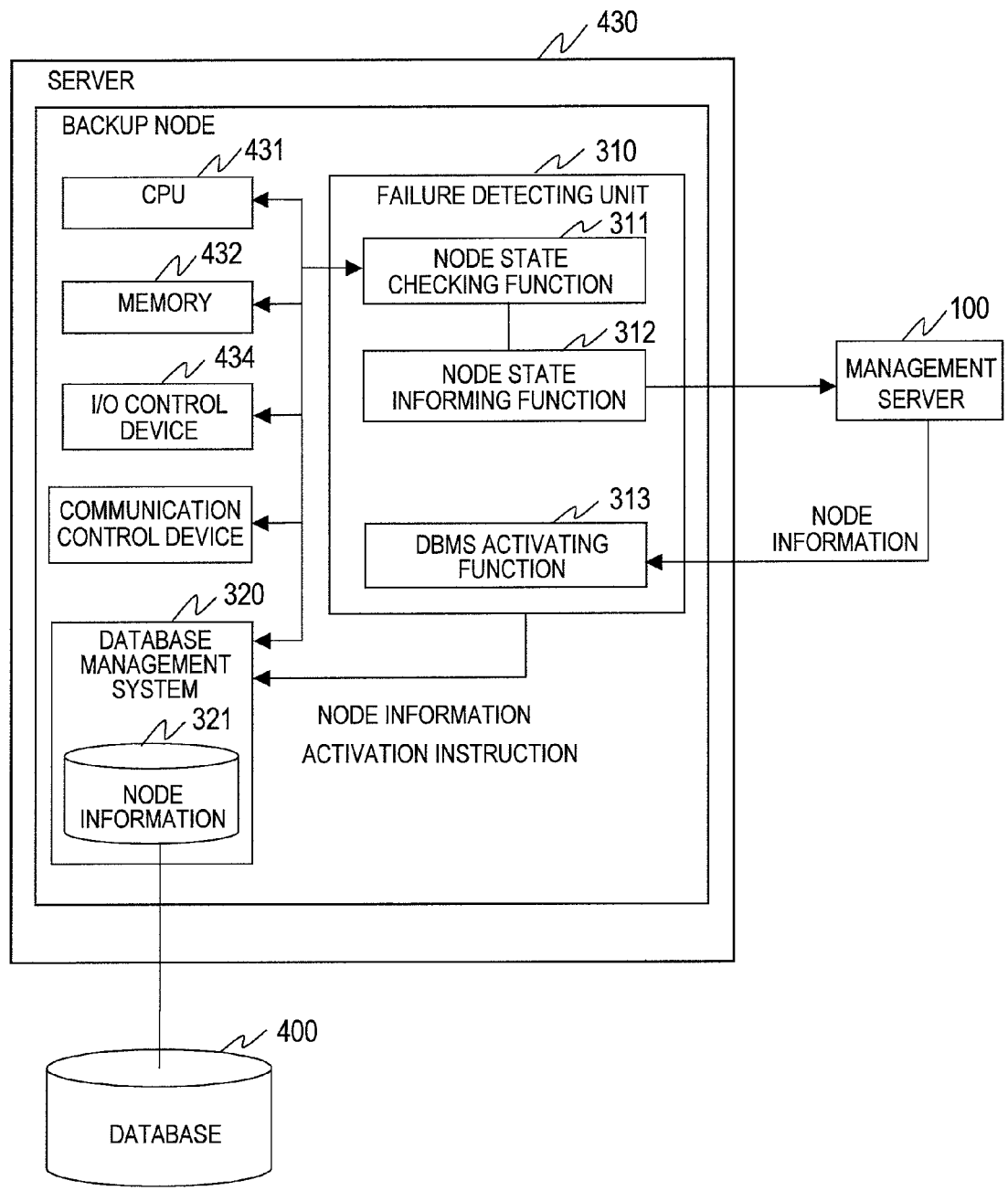
FIG. 17 is a block diagram showing in detail function elements of a backup node.

FIG. 17 is a block diagram showing in detail function elements of the backup node 300 that has the configuration of FIG. 14. Shown in FIG. 17 is one server 430 which constitutes one node in the backup node 300. Of functions of the failure detecting unit 310 in the backup node 300, a node state checking function 311 and a node state informing function 312 are similar to the node state checking function 211 and the node state informing function 212 in the active node 200, respectively.

A DBMS activation processing function 313 (DBMS activating function 313) of the failure detecting unit 310 receives, from the management server 100, an instruction to activate the database management system 320 and failover source node information. The DBMS activation processing function 313 hands over node information that is obtained from a failover source node in the active node 200 to the database management system 320, and instructs the database management system 320 to boot up.

FIG. 18 shows a configuration example of the backup node management table 1300, which is used to manage backup nodes, when the backup node 300 is composed of a backup node A, a backup node B, and a backup node C.

The backup node management table 1300 holds, for each backup node name (or identifier) 1301, the node's digitalized CPU performance (e.g., relative processing performance) within the backup node 300 in a field for a CPU load 1302, "exclusive" or "shared" as an I/O performance indicator (the I/O performance is higher when the use is exclusive than when shared) in a field for an I/O performance 1304, the node's communication performance in a field for a communication performance 1305, and OS set values related to the database processing performance in fields for OS settings A 1306 and OS settings B 1307. The OS set values in the fields for the OS settings A 1306 and the OS settings B 1307 are, for example, kernel parameter values, and are variable OS set values such as the message queue count, the maximum semaphore count, and the maximum shared memory segment size. For instance, in FIG. 18, a value in the field for the OS settings A 1306 indicates the message queue count and a value in the field for the OS settings B 1307 indicates the maximum shared memory segment size (KB).

FIG. 19 shows a configuration example of the DB information analysis table 131, which stores information for analysis made by the DB information analyzing function 122 on DB information that is obtained from the active node 200.

In the DB information analysis table 131, a threshold 1312 is set for each piece of DB information 1311, and necessary resource details 1313 are set when the DB information 1311 exceeds its threshold 1312. Set as the necessary resource details are a necessary subject resource name 1314 and a necessary resource amount 1315. A value set as the necessary resource amount 1315 is a value that indicates the additional percentage to put on the current resource amount, or a numerical value.

When a failure occurs in one node in the active node 200, the backup node management unit 120 calculates a necessary resource amount from node information and DB information based on the DB information analysis table 131. Using the calculated resource amount and the backup node management table 1300, the backup node management unit 120 determines which node in the backup node 300 is to serve as a failover target. For instance, when a failure occurs in a node in the active node 200 whose CPU performance is 100 and I/O performance is "shared", and when the excess DB processing process (thread) down count per unit time is 16, the CPU performance required of a failover target backup node is 100×1.3=130, and the I/O performance required of the failover target backup node is "exclusive". Based on this information and the backup node management table 1300, the node C is chosen as the failover target.

In the case where different failures occur simultaneously in the active node 200, the maximum value of the necessary resource amount 1315 is chosen out of records of the DB information analysis table 131 that have the same subject resource name 1314. For instance, when a failure in one node in the active node 200 causes the message queue overstay time to exceed the threshold 1312 and at the same time another failure causes the excess down count to exceed the threshold 1312, "+30%", which is the maximum value of the necessary resource amount 1315 of the two is chosen, and the CPU performance required of a failover target backup node is 100×1.3=130%.

Desirably, the servers 420 in the active node 200 all have equal CPU performance, equal I/O performance, and equal communication performance. Once a failure occurs, the load may be varied from one server 420 to another. It is therefore desirable to build the backup node 300 such that the performance level varies among the servers 430 as shown in FIG. 18. The performance standard of the nodes A to C, which constitute the backup node 300, can be set according to the building cost of the backup node 300. For instance, in the case where the cost is not much of a concern, the performance of the active node 200 is set as a low performance level for the backup node 300. In the case where a limited cost is allotted to construction of the backup node 300, the performance of the active node 200 is set as an intermediate performance level for the backup node 300. The backup node 300, which is composed of three nodes, A to C in FIG. 18, may be composed of a large number of nodes and contain a plurality of servers 430 that have the same performance level.

Figure 20:
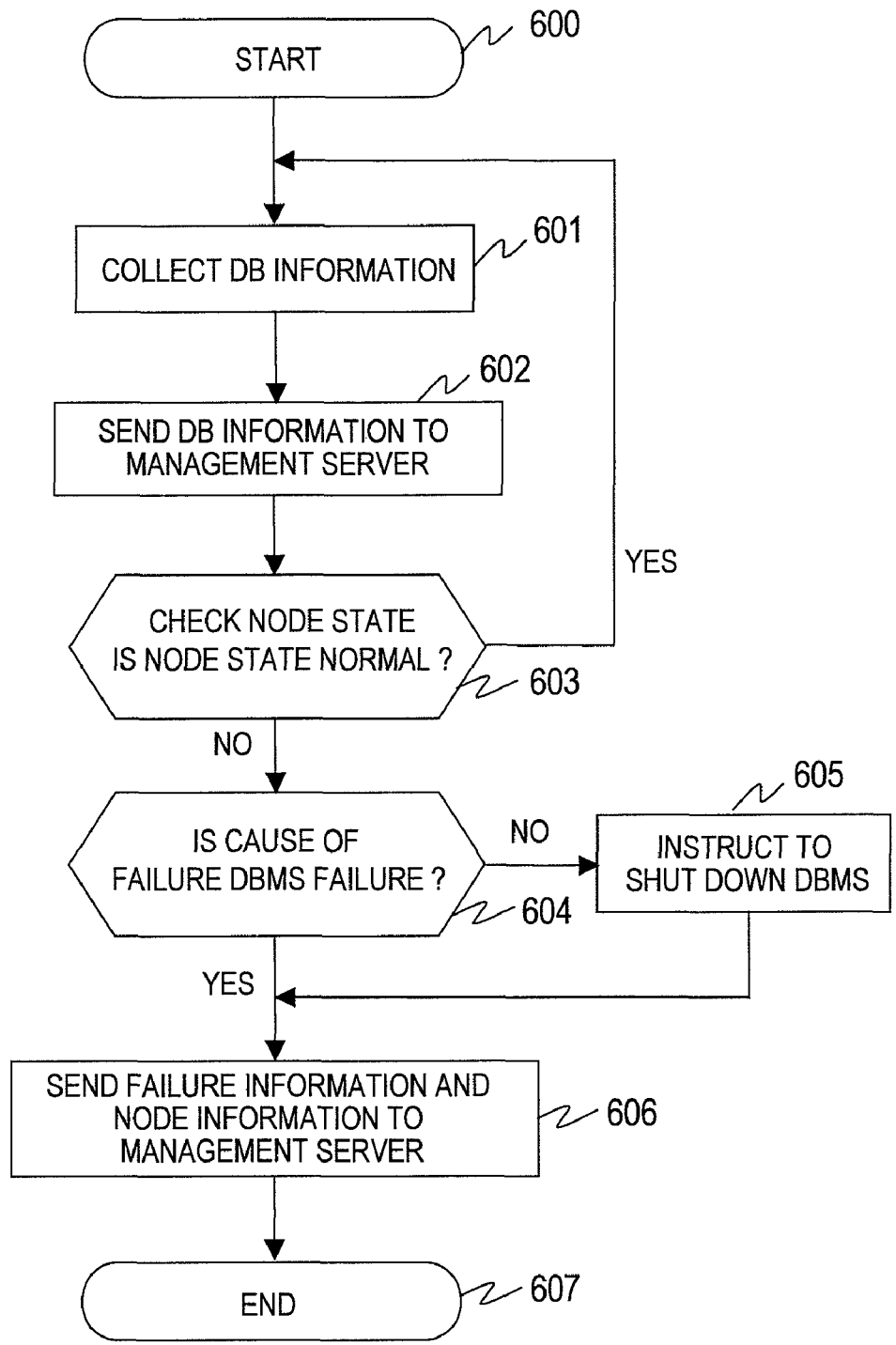
FIG. 20 is a flow chart for a processing procedure that is executed in an active node when a failure occurs.

FIG. 20 is a flow chart for a processing procedure that is executed when a failure occurs in the active node 200 according to this embodiment. This processing is executed in each server 420 of the active node 200 at regular intervals or the like.

The DB state obtaining function 231 in the active node 200 obtains, in Step 601, DB information of the database management system 220. The obtained DB information is sent by the DB state notifying function 232 to the management server 100 in Step 602.

The node state checking function 211 checks, in Step 603, the processing load of the CPU 421, a memory use amount of the memory 422, the processing load of the I/O control device 424, the communication load of the communication control device 423, and the database management system 220 to find out whether they are in a normal state. When they are in a normal state, the node state checking function 211 repeats Steps 601 to 603 at regular time intervals. When any of the checked items is not in a normal state, the procedure advances to Step 604.

In Step 604, whether the cause of failure is a DBMS failure or not is checked. When the cause of failure is a DBMS failure (shutdown or processing delay of the DBMS), it means that the database management system 220 has been shutdown abnormally, and the procedure advances to Step 606, where specifics of the failure and node information are sent to the management server 100.

When the cause of failure is not a DBMS failure in Step 604, it means that the database management system 220 itself is operating normally, and the procedure advances to Step 605. In Step 605, a shutdown instruction is issued to the database management system 220 and the database management system 220 is shut down. The procedure then advances to Step 606, where specifics of the failure and node information are sent to the management server 100.

Figure 21:
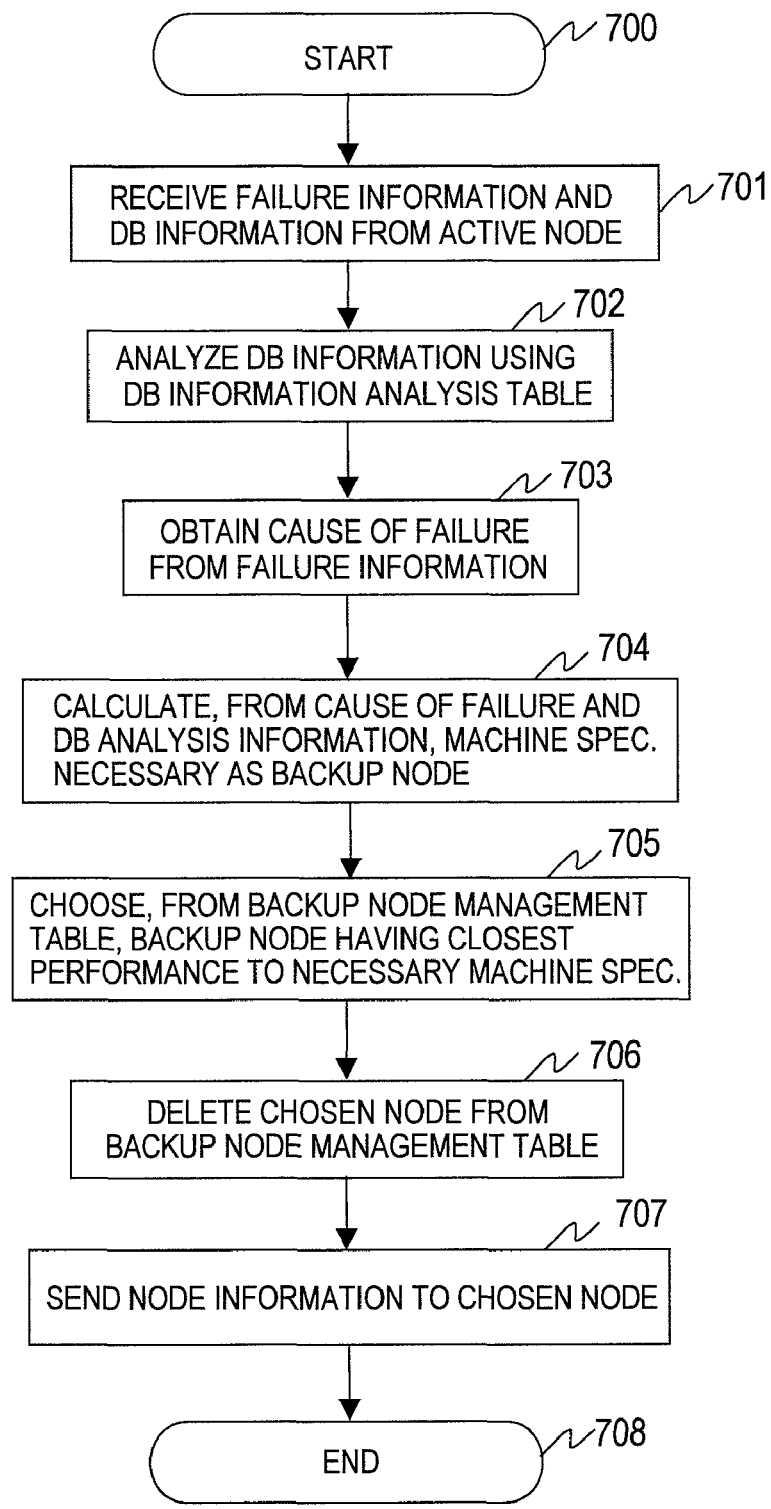
FIG. 21 is a flow chart for a processing procedure that is executed when the management server receives failure information from an active node.

FIG. 21 is a flow chart for a processing procedure that is executed when the management server 100 receives failure information from the active node 200.

The failure information collecting function 111 of the management server 100 receives, in Step 701, failure information or DB information from the active node 200. In Step 702, the DB information analyzing function 122 uses the DB information analysis table 131 to analyze the received DB information (or DB information read out of the DB information storing unit 104).

The backup node selecting function 121 obtains, in Step 703, the cause of failure from the failure information to calculate, in Step 704, a spec. necessary as a failover target backup node based on the DB analysis information obtained in Step 702, the cause of failure information obtained in Step 703, and the DB information analysis table 131.

In Step 705, the backup node selecting function 121 chooses, from the backup node management table 1300, a node in the backup node 300 that has the closest performance to the calculated spec. and determines this node as a failover target. In Step 706, information of the node in the backup node 300 that is determined in Step 705 as a failover target is deleted from the backup node management table 1300. The backup node activating function 112 sends, in Step 707, node information of the failed node in the active node 200 and an activation instruction to the node in the backup node 300 that is determined as a failover target.

Figure 22:
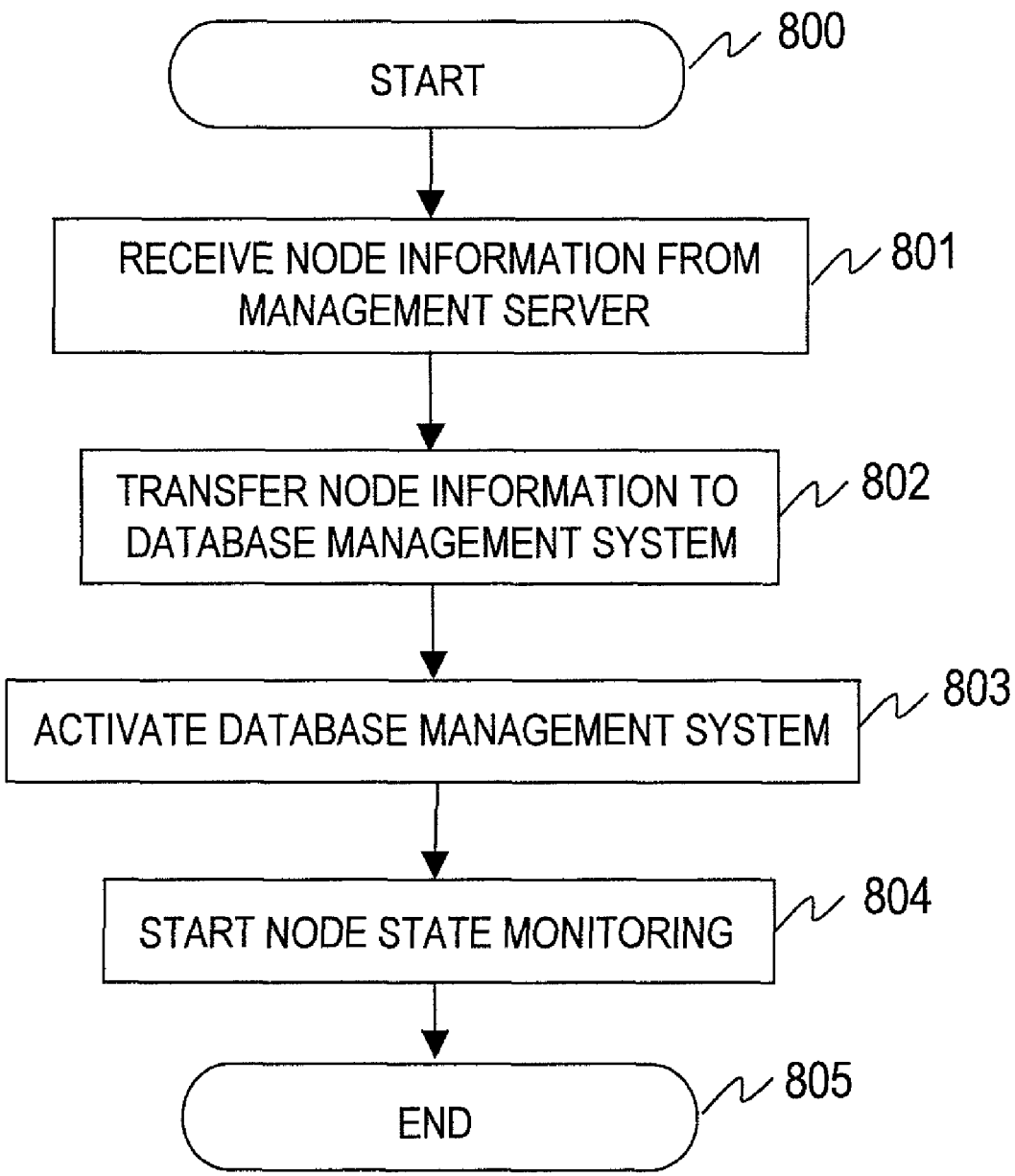
FIG. 22 is a flow chart for a processing procedure that is executed when a backup node receives node information and an activation notification from the management server.

FIG. 22 is a flow chart for a processing procedure that is executed when the backup node 300 receives node information and activation instruction from the management server 100.

The DBMS activating function 313 of the backup node 300 receives, in Step 801, from the management server 100, node information of a failed node in the active node 200. In Step 802, the received node information is transferred to the database management system 320, which sets information of the failed node in the active node 200. In Step 803, the DBMS activating function 313 issues an activation instruction to the database management system 320 and activates the database management system 320. After the database management system 320 finishes booting up, the failure detecting unit 310 starts node state checking in Step 804, whereby failover from the active node 200 to the backup node 300 is completed and the backup node 300 now serves as an active node.

As has been described, the cause of failure is classified into node failure and failure in a task (database management system, application, or service) that is executed by a node, so when a failure occurs, the database can be taken over by the server 430 in the backup node 300 whose performance or specification suits the specifics (type) of that particular failure. The backup node management unit 120 calculates a spec. (performance) required of the server 430 in the backup node 300 that is to take over a failed server in the active node 200, and chooses the server 430 in the backup node 300 that has the closest spec. to this calculated spec. Thus a situation can be avoided in which the performance or specification of the server 430 in the backup node 300 that takes over the active node 200 is overqualified and accordingly wasted. Resources of the backup node 300 can be used more effectively in this way.

Furthermore, recovery from a failure in the active node 200 is ensured since the cause of a task failure is detected in addition to the cause of a node failure and the management server 100 calculates the performance of a computer in the backup node 300 that is needed to make recovery from the failure possible. By choosing a computer in the backup node 300 that has the closest performance to the calculated performance, waste of resources of the backup node 300 is prevented and efficient failover is accomplished.

Fifth Embodiment

Figure 23:
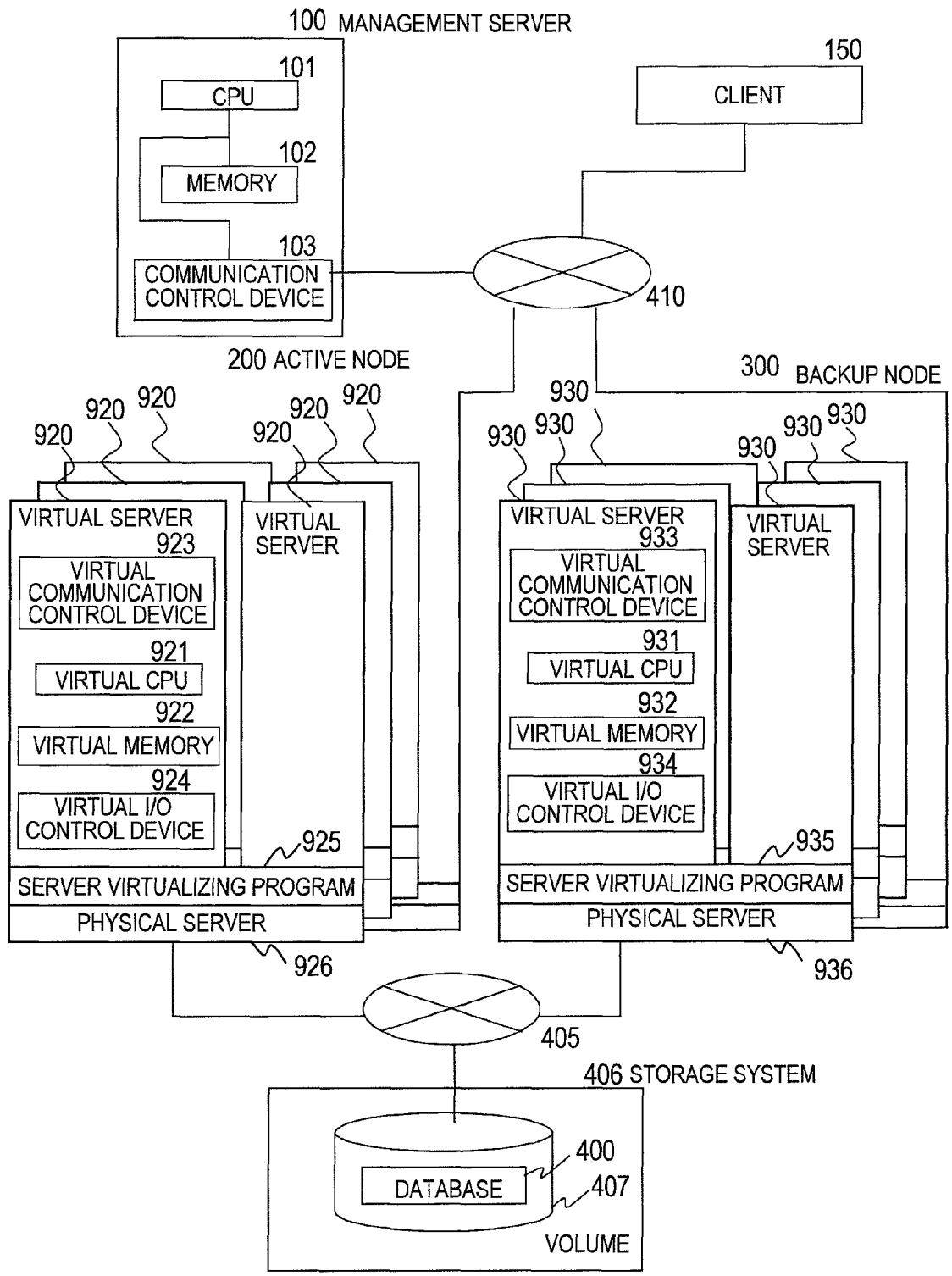
FIG. 23 is a block diagram of a computer system to which a fifth embodiment of this invention is applied.

FIG. 23 is a block diagram showing the hardware configuration of a computer system to which a fifth embodiment of this invention is applied. In contrast to the fourth embodiment where one active node is set up in one physical server and system switching is made for failover from one physical server (420) to another (430) when a failure occurs, the fifth embodiment has a configuration in which one or more virtual servers are set up in a physical server and system switching is made for failover on a virtual server basis.

In the fifth embodiment, a function of dynamically changing resources of a failover target virtual server in a backup node is added to the failover target selecting method of the fourth embodiment. The rest of the configuration of the fifth embodiment is the same as that of the fourth embodiment, and components common to the fourth and fifth embodiments are denoted by the same reference symbols.

In FIG. 23, an active node 200 is composed of one or more physical servers 926. Each physical server is composed of one or more virtual servers 920 set up by a server virtualization program 925. Each virtual server 920 has a virtual CPU 921, which performs computation processing, a virtual memory 922, which stores a database processing program and data, a virtual communication control device 923, which communicates with another computer via a network 410, and a virtual I/O control device (host bus adapter) 924, which accesses a storage system 406 via a SAN (Storage Area Network) 405.

A backup node 300 is composed of one or more physical servers 936 each of which is composed of one or more virtual servers 930 as in the active node 200. The server virtualization program 935 gives the virtual server 930 a virtual CPU 931, which performs computation processing, a virtual memory 932, which stores a database processing program and data, a virtual communication control device 933, which communicates with another computer via the network 410, and a virtual I/O control device (host bus adapter) 934, which accesses the storage system 406 via the SAN (Storage Area Network) 405.

The respective virtual CPUs, the virtual memories, the virtual communication control devices, and the virtual I/O control devices in the active node 200 and the backup node 300 are allocated resources of the CPUs, the memories, the communication control devices, and the I/O control devices in the physical servers, and each resource allocation amount is controlled by the server virtualization program 935.

Figure 24:
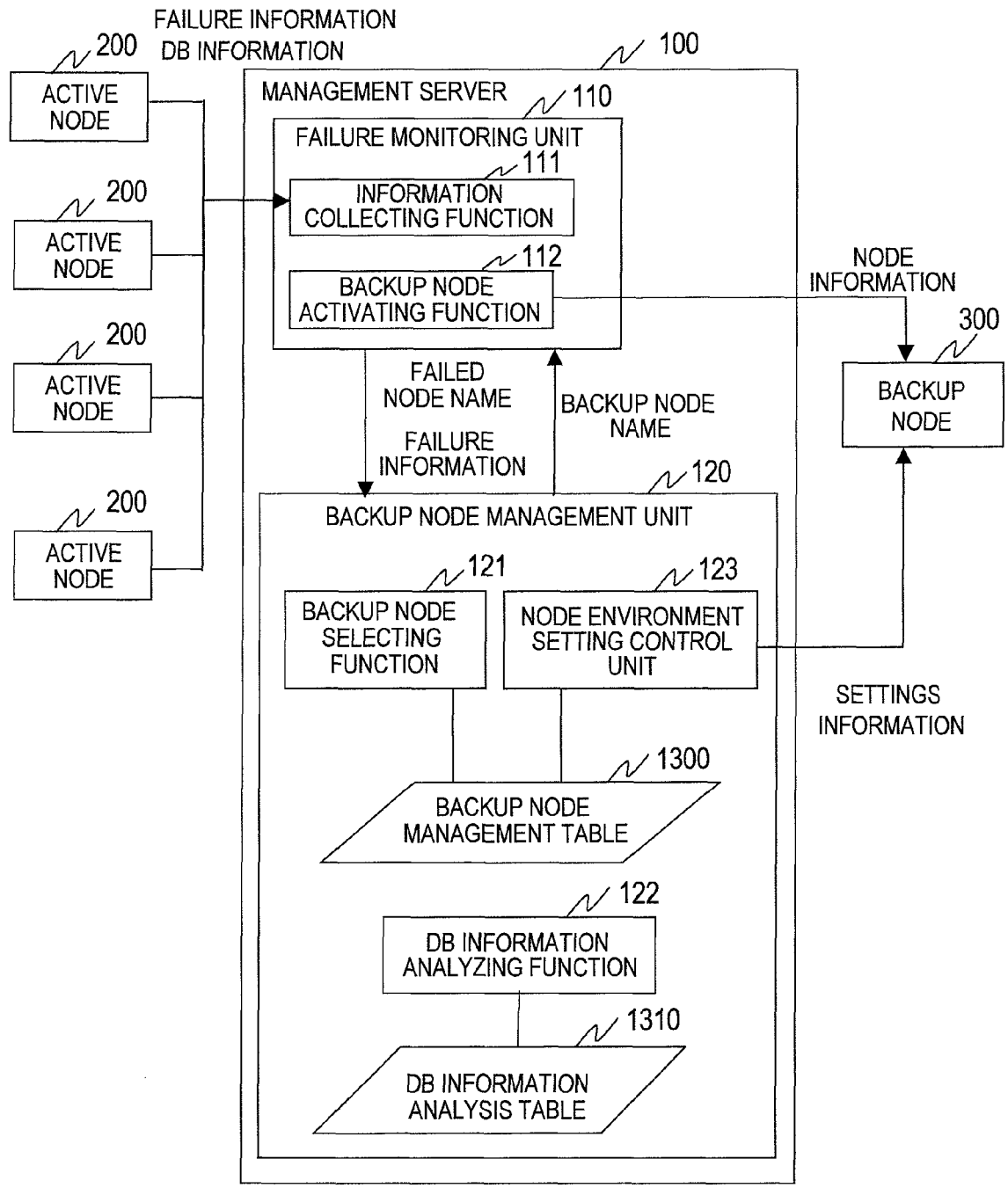
FIG. 24 is a block diagram showing in detail function elements of a management server.

In FIG. 24, DB information received from the active node 200 is used to calculate resources and OS settings necessary for a node in the backup node 300 to serve as a failover target and, before system switching is made from the active node 200 to the backup node 300, processing is performed to change the virtual CPU 931, the virtual memory 932, the virtual communication control device 933, the virtual I/O control device 934, and OS parameters in the backup node 300. The server virtualization program 935 creates at least one virtual server 930 in the backup node 300.

A management server 100 is composed of a failure monitoring unit 110 and a backup node management unit 120. The backup node management unit 120 in the fifth embodiment is obtained by adding a node environment setting control unit 123 to the backup node management unit 120 of the fourth embodiment. The node environment setting control unit 123 obtains resource information and OS settings needed by the backup node 300 from the result of analysis made by a DB information analyzing function 122 on DB information.

The node environment setting control unit 123 uses a backup node management table 1300 to choose which virtual server 930 in the backup node 300 needs a settings change, and sends settings information, which is composed of resource information and OS settings, to the chosen virtual server 930 in the backup node 300.

After the setting of the backup node 300 is finished, the node environment setting control unit 123 updates the backup node management table 1300.

The other functions are the same as in the fourth embodiment.

Figure 25:
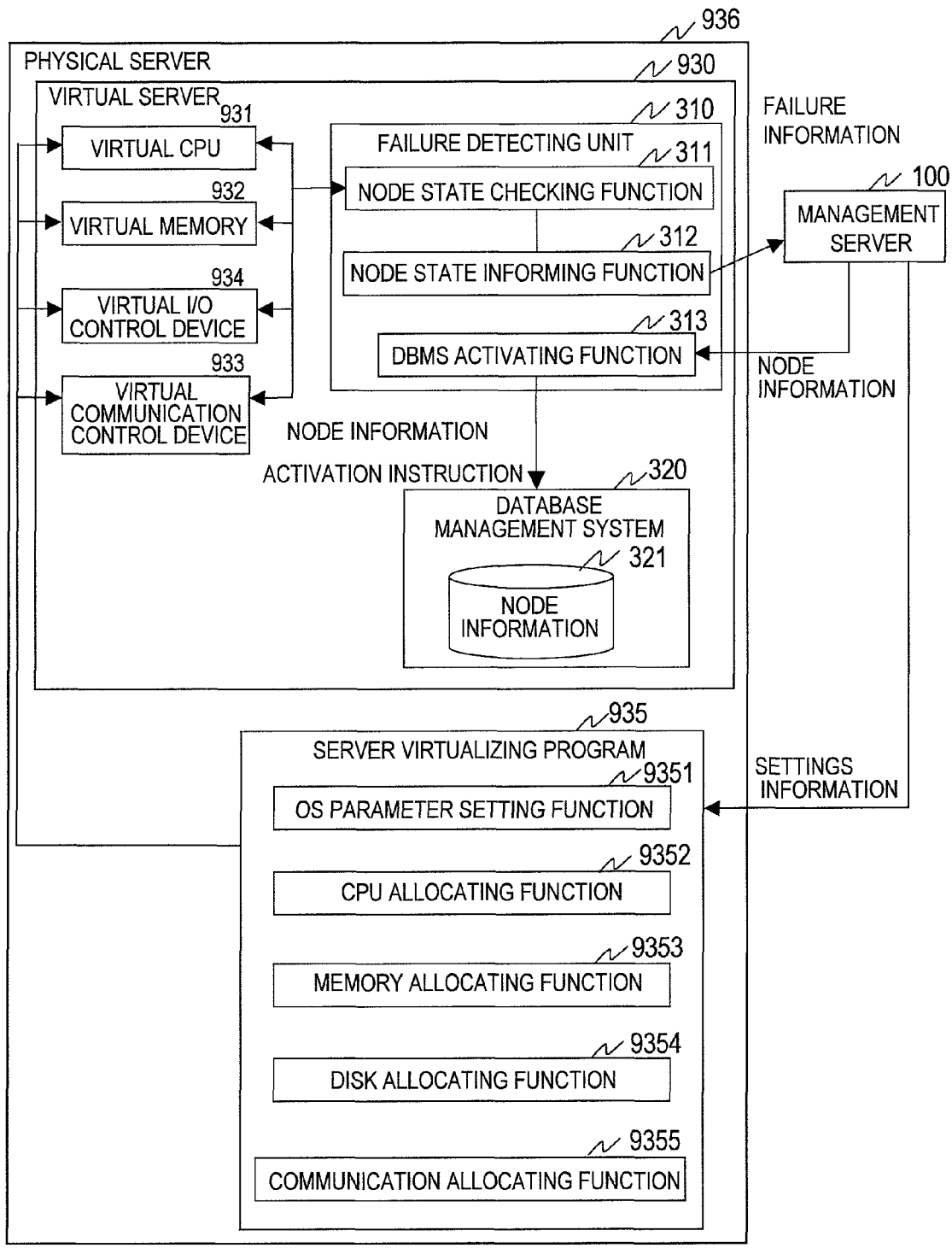
FIG. 25 is a block diagram showing in detail function elements of a backup node.

FIG. 25 shows one physical server 936 which constitutes one node in the backup node 300. The server virtualization program 935 allocates resources (CPU, memory, I/O control device, communication control device, OS parameters, and the like) of the physical server 936 to the virtual server 930. An OS parameter setting function 9351 changes OS parameter values of the virtual server 930 according to settings information sent from the management server 100.

A CPU allocating function 9352 changes how much of the CPU in the physical server 936 is allocated to the virtual CPU 931 of the virtual server 930 according to settings information sent from the management server 100. A memory allocating function 9353 changes how much of the memory in the physical server 936 is allocated to the virtual memory 932 of the virtual server 930 according to settings information sent from the management server 100. A DISK allocating function 9354 changes how much of the I/O control device in the physical server 936 is allocated to the virtual I/O control device 934 of the virtual server 930 according to settings information sent from the management server 100. A communication allocating function 9355 changes how much of the communication control device in the physical server 936 is allocated to the virtual communication control device 933 of the virtual server 930 according to settings information sent from the management server 100.

The other functions are the same as in the fourth embodiment.

Figure 26:
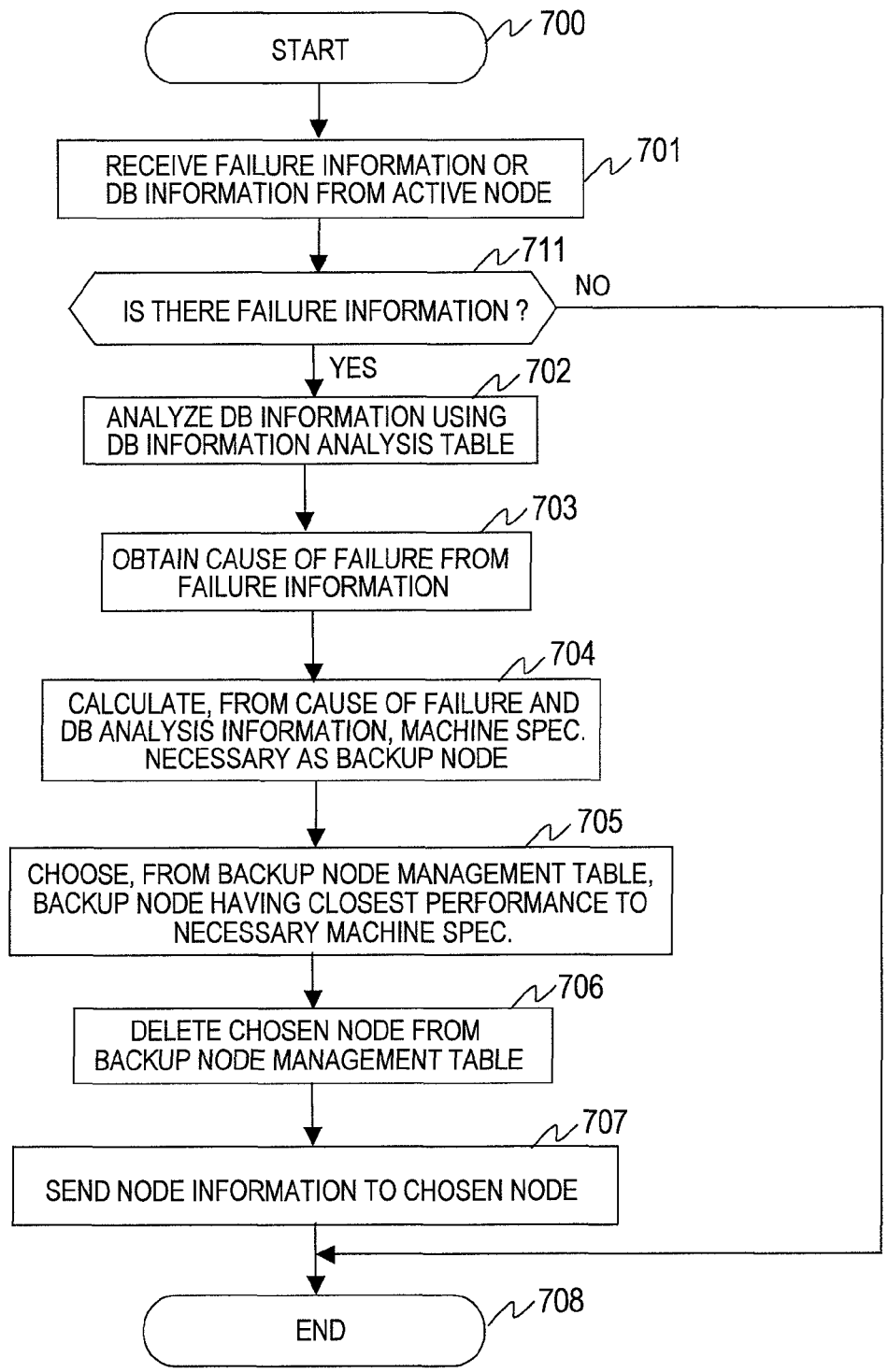
FIG. 26 is a flow chart for a processing procedure that is executed when the management server dynamically changes resources of a backup node.

FIG. 26 is a flow chart for a processing procedure of system switching by dynamically changing resources allocated to one virtual server 930 which constitutes one node in the backup node 300. This processing is executed when the management server 100 receives failure information from the active node 200.

A failure information collecting function 111 of the management server 100 receives failure information or DB information from the active node 200 in Step 701. In Step 711, whether a failover has happened or not is judged from failure information. When there is failure information, the processing moves to Step 702 whereas the processing is ended immediately when there is no failure information.

In Step 702, the DB information analyzing function 122 uses a DB information analysis table 131 to analyze the received DB information (or DB information read out of a DB information storing unit 140).

A backup node selecting function 121 obtains, in Step 703, the cause of failure from the failure information to calculate, in Step 704, a spec. necessary for the virtual server 930 that serves as a failover target backup node based on the DB analysis information obtained in Step 702, the cause of failure information obtained in Step 703, and the DB information analysis table 131.

In Step 705, the backup node selecting function 121 chooses, from the backup node management table 1300, the virtual server 930 in the backup node 300 that has the closest performance to the calculated machine spec. and determines this node as a failover target. In Step 706, information of the node in the backup node 300 that is determined in Step 705 as a failover target is deleted from the backup node management table 1300. A backup node activating function 112 sends, in Step 707, node information of the failed node in the active node 200 and an activation instruction to the node in the backup node 300 that is determined as a failover target.

Figure 27:
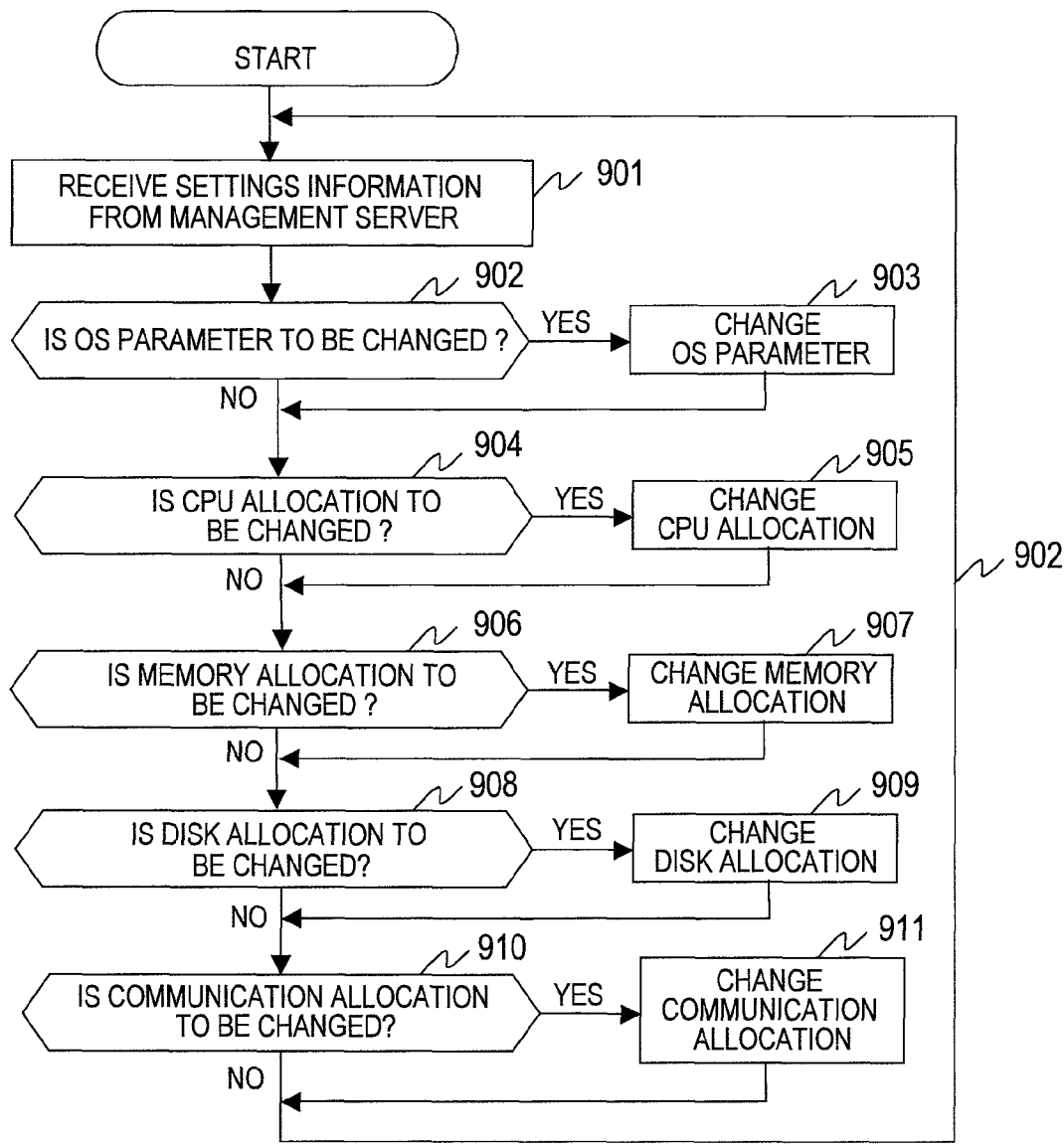
FIG. 27 is a flow chart for a processing procedure that is executed when a backup node receives a resource change notification from the management server.

FIG. 27 is a flow chart for a processing procedure that is executed when the backup node 300 obtains, from the management server 100, settings information for changing backup node settings.

The server virtualization program 935 of the backup node 300 receives, in Step 901, settings information from the management server 100. When it is found in Step 902 that the received settings information includes an OS parameter change, OS parameters are changed in Step 903 and the procedure advances to Step 904. When the received settings information does not include an OS parameter change, the procedure advances directly to Step 904. When it is found in Step 904 that the received settings information includes a CPU allocation change, the CPU allocation is changed in Step 905 and the procedure advances to Step 906. When the received settings information does not include a CPU allocation change, the procedure advances directly to Step 906. When it is found in Step 906 that the received settings information includes a memory allocation change, the memory allocation is changed in Step 907 and the procedure advances to Step 908. When the received settings information does not include a memory allocation change, the procedure advances directly to Step 908. When it is found in Step 908 that the received settings information includes a DISK allocation change, the DISK allocation is changed in Step 909 and the procedure advances to Step 910. When the received settings information does not include a DISK allocation change, the procedure advances directly to Step 910. When it is found in Step 910 that the received settings information includes a communication allocation change, the communication allocation is changed in Step 911 and the procedure returns to Step 901. When the received settings information does not include a communication allocation change, the procedure immediately returns to Step 901, whereby the processing of dynamically changing backup node resources is ended.

As has been described, the cause of failure is classified into node failure and failure in a database management system, so that, when a failure occurs, the database can be taken over by the virtual server 930 in the backup node 300 whose performance or specification suits the specifics of that particular failure. In addition, the node environment setting control unit 123 enables the backup node management unit 120 to change the spec. (performance or specification) of the virtual server 930 dynamically, thereby making it possible to use resources of the backup node 300 with efficiency.

Sixth Embodiment

Figure 28:
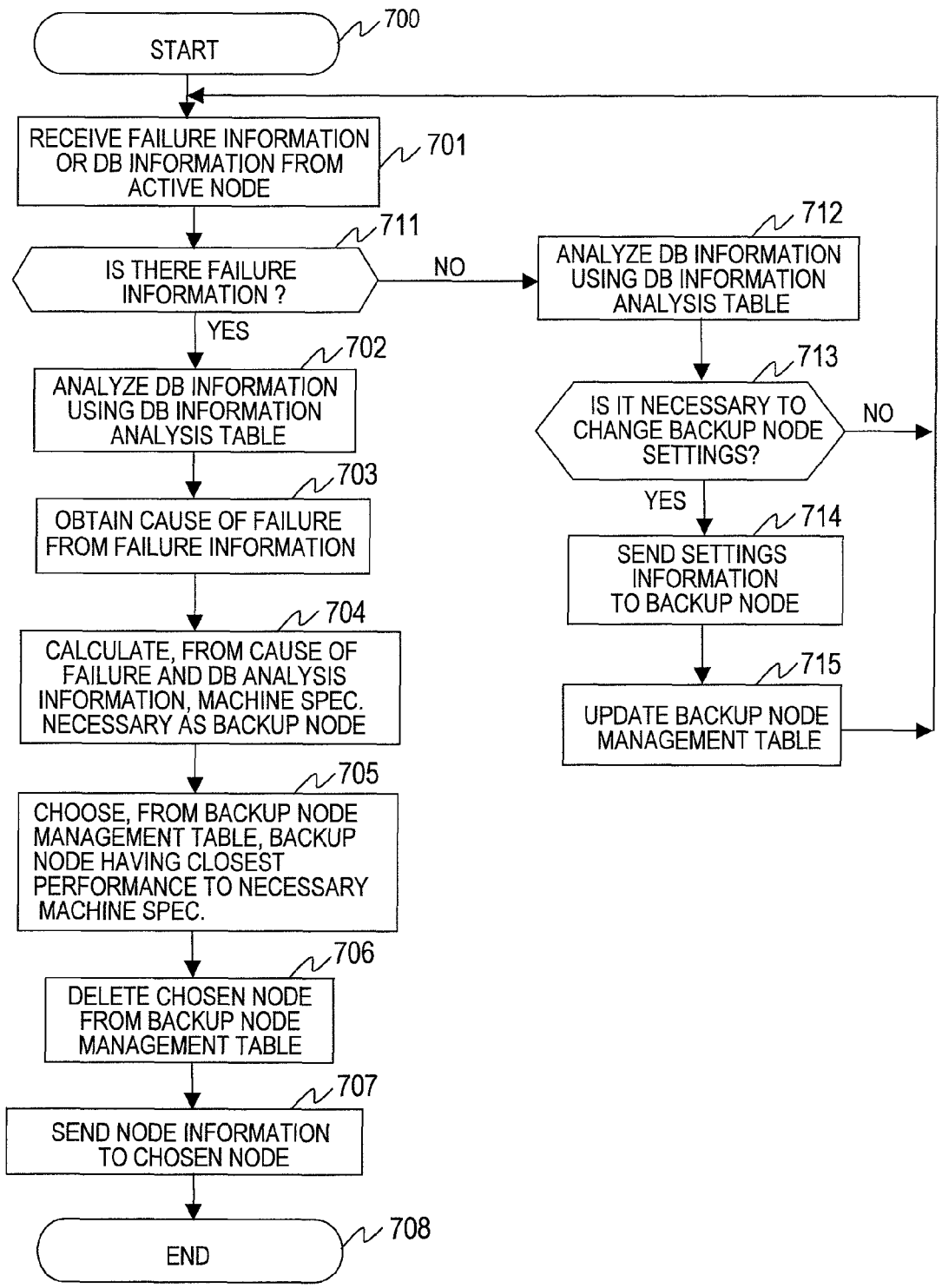
FIG. 28 is a flow chat for a processing procedure that is executed according to a sixth embodiment when a management server dynamically changes resources of a backup node.

FIG. 28 shows a sixth embodiment in which the management server 100 sets up the virtual server 930 that has a spec. necessary as a failover target irrespective of whether the active node 200 is actually experiencing a failure or not. The rest of the configuration of the sixth embodiment is the same as in the fifth embodiment.

Processing of Step 701 to Step 707 of FIG. 28 is the same as in the fifth embodiment, and is executed by the management server 100 when failure information is received.

When it is judged in Step 711 that there is no failure information, the DB information analyzing function 122 refers to the DB information analysis table 131 to analyze the received DB information in Step 712. In this analysis, the virtual server 920 in the active node 200 that exceeds a given rate (e.g., 90%) of the threshold in the DB information analysis table 131 is extracted as a virtual server that is likely to suffer a failure out of the received DB information. The DB information analyzing function 122 then obtains, from the DB information analysis table 131, how much additional resource amount is necessary for the virtual server 930 in the backup node 300 as a failover target for the extracted virtual server 920.

In Step 713, the node environment setting control unit 123 calculates, from the additional resource amount obtained in Step 712, a machine spec. necessary for the virtual server 930 in the backup node 300 as a failover target for the extracted virtual server 920 in the active node 200.

The node environment setting control unit 123 also checks in Step 713 whether or not a backup node whose spec. is close to the necessary machine spec. calculated in Step 712 is found among nodes in the backup node 300 that are managed with the backup node management table 1300. When the check reveals that no backup node has a spec. close to the necessary machine spec., the node environment setting control unit 123 judges that the backup node 300 needs to change settings, and proceeds to Step 714. When a backup node having a spec. close to the necessary machine spec. is found in Step 713, the node environment setting control unit 123 returns to Step 701.

In Step 714, the node environment setting control unit 123 chooses, based on the machine spec. calculated in Step 713 and the backup node priority table 130, the virtual server 930 in the backup node 300 whose settings need to be changed, and sends settings information to be changed to the server virtualization program 935 of the backup node 300. In Step 715, information of the node in the backup node 300 whose settings have just been changed is updated in the backup node priority table 130 and the node environment setting control unit 123 returns to Step 701.

The above-mentioned processing enables the backup node management unit 120 of the management server 100 to detect, when there is no failure at present, the virtual server 920 whose database management system 220 is expected to suffer a failure. When no virtual server 930 is capable of serving as a failover target for the virtual server 920 that is likely to experience a database management system failure, the node environment setting control unit 123 sends settings information to the server virtualization program 935 of the backup node 300, so that the virtual server 930 that has a necessary spec. can be set up in the backup node 300 before the expected failure actually occurs. By setting up the failover target virtual server 930 in the backup node 300 prior to a failure, the time required for failover can be cut short.

Furthermore, resources of the backup node 300 are not wasted since the DB information analyzing function 122 detects the virtual server 920 in the active node 200 that is associated with DB information that exceeds a given threshold rate, out of DB information that does not exceed the threshold in the DB information analysis table 131, as a virtual server that is likely to experience a failure.

The above embodiments show examples in which the server 420 in the active node 200 executes the database management system 220. However, the server 420 can provide other services than the database service, and may execute WEB services and the like.

The database management system 220 in the above embodiments is executed in each server 420 (node) individually. Alternatively, the same processing may be executed in a plurality of servers 420 in parallel.

As has been described, this invention is applicable to a computer system that has an active node and a backup node to switch the active node to the backup node when a failure occurs therein.

While the present invention has been described in detail and pictorially in the accompanying drawings, the present invention is not limited to such detail but covers various obvious modifications and equivalent arrangements, which fall within the purview of the appended claims.

What is claimed is:

1. A method of managing a computer system,
    the computer system including: a first computer system, which has a plurality of computers executing a task; and a second computer system, which has a plurality of computers to take the task executed by the computers of the first computer system over to the computers of the second computer system when a failure occurs in the computers of the first computer system,
    the method comprising the steps of:

collecting operating state information, which indicates an operating state of each computer in the first computer system;

detecting, from the operating state information, a failure in one of the computers constituting the first computer system;

detecting, from the operating state information, a cause of the failure that occurs due to at least one of CPU load, I/O load, communication failure and DBMS failure in the failed computer of the first computer system;

obtaining load and performance information about CPU load, I/O load and communication—performance of the computers constituting the second computer system;

choosing, based on the cause of the failure of the failed computer of the first computer system and the obtained load and performance information of the computers constituting the second computer system, one of the computers in the second computer system that can be used for recovery from the failure; and handing the task that has been executed by the failed computer of the first computer system over to the chosen computer of the second computer system.

2. The method of managing a computer system according to claim 1, wherein the computers constituting the second computer system is smaller in number than the computers constituting the first computer system.

3. The method of managing a computer system according to claim 1, wherein the second computer system contains computers of different CPU load, I/O load and communication performance levels, and wherein, in the step of choosing a computer that can be used for recovery from the failure, a computer having a given CPU load, I/O load and communication performance that can remove the cause of the failure is chosen.

4. The method of managing a computer system according to claim 1, wherein the step of detecting a failure in one of the computers constituting the first computer system includes the steps of:

obtaining the CPU load, the I/O load and communication performance information about load and performance of the computers in the first computer system;

comparing the CPU load, the I/O load and communication performance information against a preset value to judge that a failure has occurred when a result of the comparison meets a preset condition; and determining the cause of the failure from the type of the load and performance information.

5. The method of managing a computer system according to claim 1, further comprising the steps of:

dividing, by the computers constituting the first computer system, a database stored in a storage system into divided databases; and associating, by the computers constituting the first computer system, one computer to each divided database to provide data processing as the task.

6. The method of managing a computer system according to claim 5, wherein the step of detecting a failure in one of the computers constituting the first computer system includes the step of stopping data processing of the failed computer.

7. The method of managing a computer system according to Claim 1, wherein the computer system contains a management server which manages the first computer system and the second computer system, and wherein the method further comprises the steps of:

detecting a failure by the management server;

choosing, by the management server, which computer can be used for recovery from the failure; and handing, by the management server, the task from the failed computer of the first computer system over to the chosen computer of the second computer system.

8. The method of managing a computer system according to claim 1, further comprising the steps of:

detecting a failure by one of the computers constituting the second computer system;

choosing, by one of the computers constituting the second computer system, which computer can be used for recovery from the failure; and handing, by one of the computers constituting the second computer system, the task from the failed computer of the first computer system over to the chosen computer of the second computer system.

9. The method of managing a computer system according to claim 1, further comprising the steps of:

calculating, from the operating state information, the CPU load, the I/O load and communication performance information about a computer load and performance that makes recovery from the failure in the first computer system possible; and changing the CPU load, the I/O load and communication performance of one of the computers constituting the second computer system according to the calculated load and performance information, wherein, in the step of choosing a computer that can be used for recovery from the failure, the computer whose performance is changed according to the calculated load and performance information is chosen.

10. The method of managing a computer system according to claim 9, wherein the step of changing the performance of one of the computers constituting the second computer system includes the steps of:

obtaining the CPU load, the I/O load and communication performance information about the load and performance of the computers in the first computer system;

comparing the CPU load, the I/O load and communication performance information against a preset value to change the CPU load, I/O load and/or communication performance of one of the computers constituting the second computer system when a result of the comparison meets a preset condition; and changing the CPU load, I/O load and/or communication performance of the computer constituting the second computer system according to the type of the performance information.

11. The method of managing a computer system according to claim 9, wherein the step of collecting the operating state information includes the steps of:

collecting first operating state information, which indicates operating state of each computer in the first computer system; and collecting second operating state information, which indicates execution state of the task executed individually by each computer in the first computer system, wherein, in the step of detecting a failure in one of the computers, a failure in one of the computers constituting the first computer system is detected from the first operating state information, and wherein, in the step of changing the load and performance of one of the computers constituting the second computer system, load and performance information about a load and computer performance of a computer which can be used for recovery from the failure in the first computer system is calculated from the second operating state information, and the load and performance of one of the computers constituting the second computer system is changed according to the calculated load and performance information.

12. The method of managing a computer system according to claim 1, wherein said load and performance information of the computers in the second computer system comprises priority corresponding to each of the causes of the failure, the priority depending on load and performance differences among the computers in the second computer system;
wherein the step of choosing one of the computers in the second computer system includes the steps of:
choosing the computer having higher priority of the CPU load information if the cause of failure is CPU load;
choosing the computer having higher priority of I/O load information if the cause of failure is I/O load; and
choosing the computer having higher priority of communication performance information if the cause of failure is communication failure or DBMS failure.

13. A method of managing a computer system,
the computer system including: a first computer system, which has a plurality of computers executing a task; and a second computer system, which has a plurality of computers to take the task executed by the computers of the first computer system over to the computers of the second computer system when a failure occurs in the computers of the first computer system, the method comprising the steps of:
collecting operating state information, which indicates operating state of each computer in the first computer system;
detecting, from the operating state information, a failure in one of the computers constituting the first computer system;
detecting, from the operating state information, a cause of the failure that occurs due to at least one of CPU load, I/O load, communication failure and DBMS failure in the failed computer of the first computer system;
obtaining performance information about the CPU load, the I/O load and communication performance of the computers constituting the second computer system;
calculating, from the cause of the failure in the first computer system and from the obtained load and performance information of the computers in the second computer system, load and performance information that enables one of the computers in the second computer system to recover from the failure;
choosing, out of the computers in the second computer system, one that satisfies the calculated load and performance information; and
handing the task that has been executed by the failed computer of the first computer system over to the chosen computer of the second computer system.

14. The method of managing a computer system according to claim 13, wherein said load and performance information of the computers in the second computer system comprises priority corresponding to each of the causes of the failure, the priority depending on load and performance differences among the computers in the second computer system;
wherein the step of choosing one of the computers in the second computer system includes the steps of:
choosing the computer having higher priority of the CPU load information if the cause of failure is CPU load;
choosing the computer having higher priority of I/O load information if the cause of failure is I/O load; and choosing the computer having higher priority of communication performance information if the cause of failure is communication failure or DBMS failure.

15. A method of managing a computer system,
the computer system including: a first computer system, which has a plurality of computers executing a task; and a second computer system, which has a plurality of computers to take the task executed by the computers of the first computer system over to the computers of the second computer system when a failure occurs in the computers of the first computer system, the method comprising the steps of:
collecting operating state information, which indicates operating state of each computer in the first computer system;
detecting, from the operating state information, a failure in one of the computers constituting the first computer system for failure that occurs due to at least one of CPU load, I/O load, communication failure and DBMS failure;
obtaining load and performance information about CPU load, I/O load and communication performance of the computers constituting the second computer system;
calculating, from a cause of the failure of the failed computer in the first computer system and from the obtained load and performance information of the computers in the second computer system, load and performance information that enables one of the computers in the second computer system to recover from the failure;
changing the CPU load, I/O load and/or communication CPU load performance of one of the computers constituting the second computer system according to the calculated load and performance information;
choosing the computer in the second computer system whose performance CPU load, I/O load and/or communication has been changed according to the calculated load and performance information as a failover target of the first computer system; and
handing the task that has been executed by the failed computer of the first computer system over to the chosen computer of the second computer system.

16. The method of managing a computer system according to claim 15, further comprising the steps of:
predicting a failure in the computers constituting the first computer system by comparing the operating state information against a preset value;
identifying, from the operating state information, a cause of the predicted failure and calculating, from the cause of failure, the load and performance information of the computer that makes recovery from the predicted failure possible; and
changing the CPU load, I/O load and/or communication— performance of one of the computers in the second computer system according to the calculated performance information.

17. The method of managing a computer system according to claim 15, wherein said load and performance information of the computers in the second computer system comprises priority corresponding to each of the causes of the failure, the priority depending on load and performance differences among the computers in the second computer system;
wherein the step of choosing one of the computers in the second computer system includes the steps of:
choosing the computer having higher priority of the CPU load information if the cause of failure is CPU load;
choosing the computer having higher priority of I/O load information if the cause of failure is I/O load; and choosing the computer having higher priority of communication performance information if the cause of failure is communication failure or DBMS failure.

18. A management server with a processor, a memory, and an interface in a computer system with a first computer system, which has a plurality of computers executing a task, and a second computer system, which has a plurality of computers to take over, under control of the management server, the task executed by the computers of the first computer system when a failure occurs in the computers of the first computer system, each computer in the first and second computer systems having a processor, a memory, and an interface, the first computer system, the second computer system, and the management server being connected by a network via the interfaces, the management server comprising:
- a failure monitoring unit which stores, in the memory, operating state information of each computer in the first computer system that the processor has received via the interface, and which detects, from the operating state information, a failure in one of the computers in the first computer system for failure that occurs due to at least one of CPU load, I/O load, communication failure and DBMS failure;
- a backup node selecting unit which chooses, based on a cause of the failure and CPU load, I/O load and communication—performance information of the computers constituting the second computer system, one of the computers in the second computer system that can be used for recovery from the failure, the cause of the failure being detected by the processor from the operating state information; and
- a backup node activating unit which makes the processor instruct the chosen computer of the second computer system to take over the task that has been executed by the failed computer of the first computer system.

19. The management server according to claim 18, wherein said load and performance information of the computers in the second computer system comprises priority corresponding to each of the causes of the failure, the priority depending on load and performance differences among the computers in the second computer system;
wherein the backup node selecting unit chooses one of the computers in the second computer system carrying out the steps of:
choosing the computer having higher priority of the CPU load information if the cause of failure is CPU load;
choosing the computer having higher priority of I/O load information if the cause of failure is I/O load; and
choosing the computer having higher priority of communication performance information if the cause of failure is communication failure or DBMS failure.

20. A management server with a processor, a memory, and an interface in a computer system with a first computer system, which has a plurality of computers executing a task, and a second computer system, which has a plurality of computers to take over, under control of the management server, the task executed by the computers of the first computer system when a failure occurs in the computers of the first computer system, each computer in the first and second computer systems having a processor, a memory, and an interface, the first computer system, the second computer system, and the management server being connected by a network via the interfaces, the management server comprising:
- a failure monitoring unit which stores, in the memory, operating state information of each computer in the first computer system that the processor has received via the interface, and which detects, from the operating state information, a failure in one of the computers in the first computer system for failure that occurs due to at least one of CPU load, I/O load, communication failure and DBMS failure;
- a node environment setting control unit which makes the processor calculate, from the operating state information, CPU load, I/O load and communication performance information that makes recovery from the failure possible, and which sends an instruction to the second computer system to change the CPU load, I/O load and/or communication performance of one of the computers according to the calculated performance information; and
- a backup node activating unit which makes the processor instruct the computer in the second computer system, whose performance has been changed according to the calculated load and performance information, to take over the task that has been executed by the failed computer of the first computer system.

21. The management server according to claim 20,
wherein the second computer system has a virtualization unit, which runs a plurality of virtual computers on a physical computer,
wherein the node environment setting control unit sends an instruction to the virtualization unit in the second computer system to change the CPU load, I/O load and/or communication performance of one of the virtual computers according to the calculated load and performance information, and
wherein the backup node activating unit makes the processor instruct the virtual computer in the second computer system, whose load and/or performance has been changed according to the calculated load performance information, to take over the task that has been executed by the failed computer of the first computer system.

22. The management server according to claim 20, wherein said load and performance information of the computers in the second computer system comprises priority corresponding to each of the causes of the failure, the priority depending on load and performance differences among the computers in the second computer system;
wherein the node environment setting control unit sends the instruction to the second computer system based on performing the steps of:
choosing the computer having higher priority of the CPU load information if the cause of failure is CPU load;
choosing the computer having higher priority of I/O load information if the cause of failure is I/O load; and
choosing the computer having higher priority of communication performance information if the cause of failure is communication failure or DBMS failure.

23. A computer system, comprising:
a first computer system which has a plurality of computers executing a task;
a second computer system which has a plurality of computers;
a management server which makes the computers in the second computer system take over the task when a failure occurs in the computers in the first computer system; and
a network which connects the first computer system, the second computer system, and the management server to one another,
wherein each computer in the first computer system includes:
a processor which executes calculation;

an I/O control unit which controls data transfer between a data storage unit and the processor;

a communication control unit which controls communications between the processor and the network;

a state detecting unit which detects operating state of the processor, the I/O control unit, and the communication control unit;

a failure detecting unit which judges whether a failure has occurred in the state detecting unit; and a state informing unit which, when the failure has occurred, sets a site of the failure as a failure type based on failure due to at least one of CPU load, I/O load, communication failure and DBMS failure, and notifies the management server of an occurrence of the failure, the failure type, and an identifier that is assigned to a computer where the failure has occurred.

24. A program provided on a computer readable medium for a management server in a computer system, the computer system including: a first computer system, which has a plurality of computers executing a task; and a second computer system, which has a plurality of computers to take, through processing executed by the management server under control of the program, the task that has been executed by the computers of the first computer system over to the computers of the second computer system when a failure occurs in the computers of the first computer system, the program controlling the management server to execute the processings of:

collecting operating state information, which indicates operating state of each computer in the first computer system;

detecting, from the operating state information, a failure in one of the computers constituting the first computer system;

detecting, from the operating state information, a cause of the failure that occurs due to at least one of CPU load, I/O load, communication failure and DBMS failure in the failed computer of the first computer system;

obtaining load and performance information about CPU load, I/O load and communication—performance of the computers constituting the second computer system;

choosing, from the cause of the failure of the failed computer of the first computer system and from the obtained load and performance information of the computers in the second computer system, the computer that can be recovered from the failure among the computers in the second computer system; and sending an instruction to the chosen computer in the second computer system to take over the task that has been executed by the failed computer of the first computer system.

25. The program provided on a computer readable medium according to claim 24, wherein said load and performance information of the computers in the second computer system comprises priority corresponding to each of the causes of the failure, the priority depending on load and performance differences among the computers in the second computer system;

wherein the step of choosing one of the computers in the second computer system includes the steps of:

choosing the computer having higher priority of the CPU load information if the cause of failure is CPU load;

choosing the computer having higher priority of I/O load information if the cause of failure is I/O load; and choosing the computer having higher priority of communication performance information if the cause of failure is communication failure or DBMS failure.

26. A program provided on a computer-readable medium for a management server in a computer system, the computer system including: a first computer system, which has a plurality of computers executing a task; and a second computer system, which has a plurality of computers to take, through processing executed by the management server under control of the program, the task that has been executed by the computers of the first computer system over to the computers of the second computer system when a failure occurs in the computers of the first computer system, the program controlling the management server to execute the processings of:

collecting operating state information, which indicates operating state of each computer in the first computer system;

detecting, from the operating state information, a failure in one of the computers constituting the first computer system;

detecting, from the operating state information, a cause of the failure that occurs due to at least one of CPU load, I/O load, communication failure and DBMS failure in the failed computer of the first computer system;

obtaining load and performance information about CPU load, I/O load and communication performance of the computers constituting the second computer system;

calculating, from the cause of the failure in the first computer system and from the obtained load and performance information of the computers in the second computer system, computer load and performance information that makes recovery from the failure possible;

changing the CPU load, I/O load and/or communication performance of one of the computers constituting the second computer system according to the calculated load and performance information; and sending an instruction to one of the computers in the second computer system, whose—CPU load, I/O load and/or communication performance has been changed according to the calculated load and performance information, to take over the task that has been executed by the failed computer of the first computer system.

27. The program provided on a computer-readable medium according to claim 26, wherein said load and performance information of the computers in the second computer system comprises priority corresponding to each of the causes of the failure, the priority depending on load and performance differences among the computers in the second computer system;

wherein the step of sending an instruction to one of the computers in the second computer system includes the steps of:

choosing the computer having higher priority of the CPU load information if the cause of failure is CPU load;

choosing the computer having higher priority of I/O load information if the cause of failure is I/O load; and choosing the computer having higher priority of communication performance information if the cause of failure is communication failure or DBMS failure.

* * * * *